(12) United States Patent
Nagashii et al.

(10) Patent No.: US 7,267,193 B2
(45) Date of Patent: Sep. 11, 2007

(54) FRAME STRUCTURE IN MOTORCYCLE

(75) Inventors: Toshihisa Nagashii, Saitama (JP); Jun Hariu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 176 days.

(21) Appl. No.: 10/803,961

(22) Filed: Mar. 19, 2004

(65) Prior Publication Data
US 2004/0206565 A1 Oct. 21, 2004

(30) Foreign Application Priority Data
Mar. 31, 2003 (JP) .............................. 2003-095105

(51) Int. Cl.
  B62D 61/02 (2006.01)
  B62K 11/00 (2006.01)
  B62M 7/00 (2006.01)
(52) U.S. Cl. ...................... 180/219; 180/220; 180/227; 180/228
(58) Field of Classification Search ................ 180/219, 180/220, 227, 228
See application file for complete search history.

(56) References Cited

U.S. PATENT DOCUMENTS

| 4,805,716 | A | * | 2/1989 | Tsunoda et al. | 180/219 |
| 4,984,650 | A | * | 1/1991 | Horiike et al. | 180/227 |
| 5,211,255 | A | * | 5/1993 | Fukuda | 180/219 |
| 5,261,504 | A | * | 11/1993 | Katsura | 180/219 |
| 5,375,677 | A | * | 12/1994 | Yamagiwa et al. | 180/219 |
| 5,845,728 | A | * | 12/1998 | Itoh et al. | 180/219 |
| 5,921,339 | A | * | 7/1999 | Matsuura | 180/219 |
| 6,024,185 | A | * | 2/2000 | Okada et al. | 180/227 |
| 6,186,550 | B1 | * | 2/2001 | Horii et al. | 280/833 |
| 6,360,839 | B1 | * | 3/2002 | Urano et al. | 180/229 |
| 6,446,996 | B1 | * | 9/2002 | Horii | 280/281.1 |
| 6,502,658 | B1 | * | 1/2003 | Nagashii | 180/219 |
| 6,679,347 | B2 | * | 1/2004 | Iimuro | 180/219 |

FOREIGN PATENT DOCUMENTS

| JP | 55-123580 | 9/1980 |
| JP | 61-291281 | 12/1986 |
| JP | 62-26177 | 2/1987 |
| JP | 63-30292 | 2/1988 |
| JP | 01-106789 | 4/1989 |

(Continued)

*Primary Examiner*—Lesley D. Morris
*Assistant Examiner*—Marc A. Scharich
(74) *Attorney, Agent, or Firm*—Birch, Stewart, Kolasch & Birch, LLP

(57) ABSTRACT

A frame structure for a motorcycle includes a front fork which journals a front wheel and that is capable of being steered and supported by a head pipe. Front end portions of a pair of right and left pipe members are connected contiguously to the head pipe and extend downwardly and rearwardly from the head pipe. The pair of right and left pipe members each have a substantially prismatic cross sectional shape and are each bent at their longitudinally intermediate portions so as to be outwardly convex with respect to the sides of the motorcycle frame. An engine is disposed between lower portions of both pipe members in an engine mounting space. The present invention narrows the distance between the upper portions of the right and left pipe members and effectively increases the space between the lower portions of the pair of right and left pipe members.

20 Claims, 19 Drawing Sheets

FOREIGN PATENT DOCUMENTS

| | | |
|---|---|---|
| JP | 1-21919 | 6/1989 |
| JP | 1-112186 | 7/1989 |
| JP | 02-274679 | 11/1990 |
| JP | 05-039077 | 2/1993 |
| JP | 05-193544 | 8/1993 |
| JP | 6-3752 | 2/1994 |
| JP | 08-216960 | 8/1996 |
| JP | 09-175464 | 7/1997 |
| JP | 09-276451 | 10/1997 |
| JP | 2779821 | 5/1998 |
| JP | 11-129966 | 5/1999 |
| JP | 2001-010578 | 1/2001 |
| JP | 2001-63667 A | 3/2001 |
| JP | 2001-071974 | 3/2001 |

* cited by examiner

FRAME STRUCTURE IN MOTORCYCLE

CROSS-REFERENCES TO RELATED APPLICATIONS

This nonprovisional application claims priority under 35 U.S.C. § 119(a) on Patent Application No. 2003-095105 filed in Japan on Mar. 31, 2003, the entirety of which is herein incorporated by reference.

BACKGROUND OF THE INVENTION

1. Field of the Invention

The present invention relates to a motorcycle, and more particularly to a motorcycle having front end portions of a pair of right and left pipe members, each front end portion having an external shape of a prismatic cross section and which being bent sideways in an outwardly convex shape at a longitudinally intermediate position. The front end portions are connected contiguously to a head pipe, a front fork which supports a front wheel through a shaft is supported by and steerable by the head pipe, and an engine is disposed between lower portions of both the pipe members. The present invention is also concerned with the improvement of a frame structure for a motorcycle having the aforementioned structure.

2. Description of the Background Art

Applicants have determined that the background art suffers from the following disadvantages. A frame structure for a motorcycle of the background art includes a space for disposing an upper end portion of an engine to ensure adequate clearance between lower portions of a pair of right and left pipe members. Both the pipe members are formed so as to be relatively narrow in the width between their upper portions in order to make it difficult for rider's knees to come into contact with the pipe members. An example of this type of frame structure is seen in Japanese Patent Laid-open No. 2001-63667.

However, the pipe members in the aforementioned frame structure have a cross-sectional shape including lower half portions which are substantially vertical on both sides of an upper end portion of an engine and upper half portions which are bent toward a central line of a vehicle body from upper ends of the lower half portions. The pipe members are also formed by bending a stock having been subjected to extrusion. Therefore, the bent surfaces of the pipe members and their respective side walls are not orthogonal to each other and thus bending of the stock after extrusion is relatively difficult.

SUMMARY OF THE INVENTION

The present invention overcomes the shortcomings associated with the background art and achieves other advantages not realized by the background art.

An object of the present invention is to provide a frame structure in a motorcycle which permits the required bending work to be performed relatively easily.

An object of the present invention is to provide a frame structure in a motorcycle wherein the distance between lower portions of a pair of right and left pipe members can be made wider and the distance between upper portions of both pipe members can be made relatively narrow.

One or more of these and other objects are accomplished by a motorcycle frame comprising a head pipe; a front fork for supporting a front wheel through a shaft, wherein the front fork is rotatable with respect to and supported by the head pipe; a pair of right and left pipe members each having a substantially prismatic, cross-sectional shape and being connected contiguously to the head pipe, wherein each of the right and left pipe members includes a front end portion and each pipe member is bent in an outwardly convex shape with respect to a longitudinal centerline of the motorcycle frame at a longitudinally intermediate position of each pipe member, wherein each pipe member further includes an inner wall which is substantially flat throughout an overall length of each pipe member and with respect to the vertical direction of each pipe member, and an outer wall which extends substantially parallel with the inner wall, wherein the pipe members are each bent in a plane orthogonal to the inner wall and the pipe members are inclined toward each other as the pipe members extend upwardly toward and are connected contiguously to the head pipe.

One or more of these and other objects are further accomplished by a motorcycle comprising a front wheel and a rear wheel; a head pipe; a front fork for supporting the front wheel through a shaft, wherein the front fork is rotatable with respect to and supported by the head pipe; a pair of right and left pipe members each having a substantially prismatic, cross-sectional shape and being connected contiguously to the head pipe, wherein each of the right and left pipe members includes a front end portion and each pipe member is bent in an outwardly convex shape with respect to a longitudinal centerline of the motorcycle frame at a longitudinally intermediate position of each pipe member, wherein each pipe member further includes an inner wall which is substantially flat throughout an overall length of each pipe member and with respect to the vertical direction of each pipe member, and an outer wall which extends substantially parallel with the inner wall, wherein the pipe members are each bent in a plane orthogonal to the inner wall and the pipe members are inclined toward each other as the pipe members extend upwardly toward and are connected contiguously to the head pipe; an engine mounting space being disposed between lower portions of the right and left pipe members; and an engine mounted within the engine mounting space.

In the aforementioned construction, both inner and outer walls of both pipes members are formed substantially in parallel with each other, so that a bending work for both pipe members can be performed relatively easily. Since the pipe members are inclined in this relatively simple structure, it is possible to narrow the distance between upper portions of both pipe members and thereby make it difficult for rider's knees to come into contact with the pipe members and/or the distance between lower portions of both pipe members can be widened to ensure a sufficient engine mounting space.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE PREFERRED EMBODIMENTS

Figure 1:
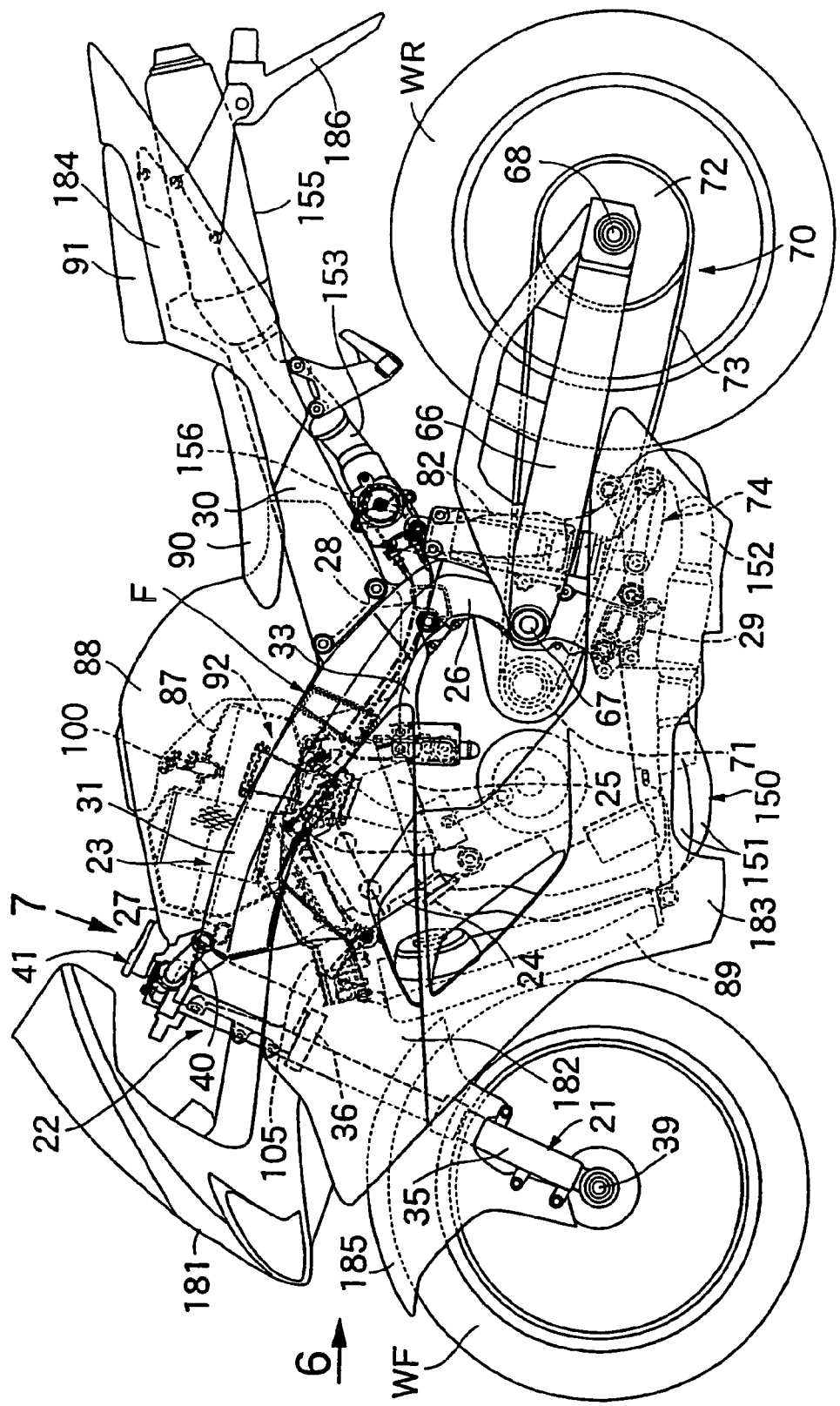
FIG. 1 is a side view of a motorcycle according to an embodiment of the present invention.
Figure 2:
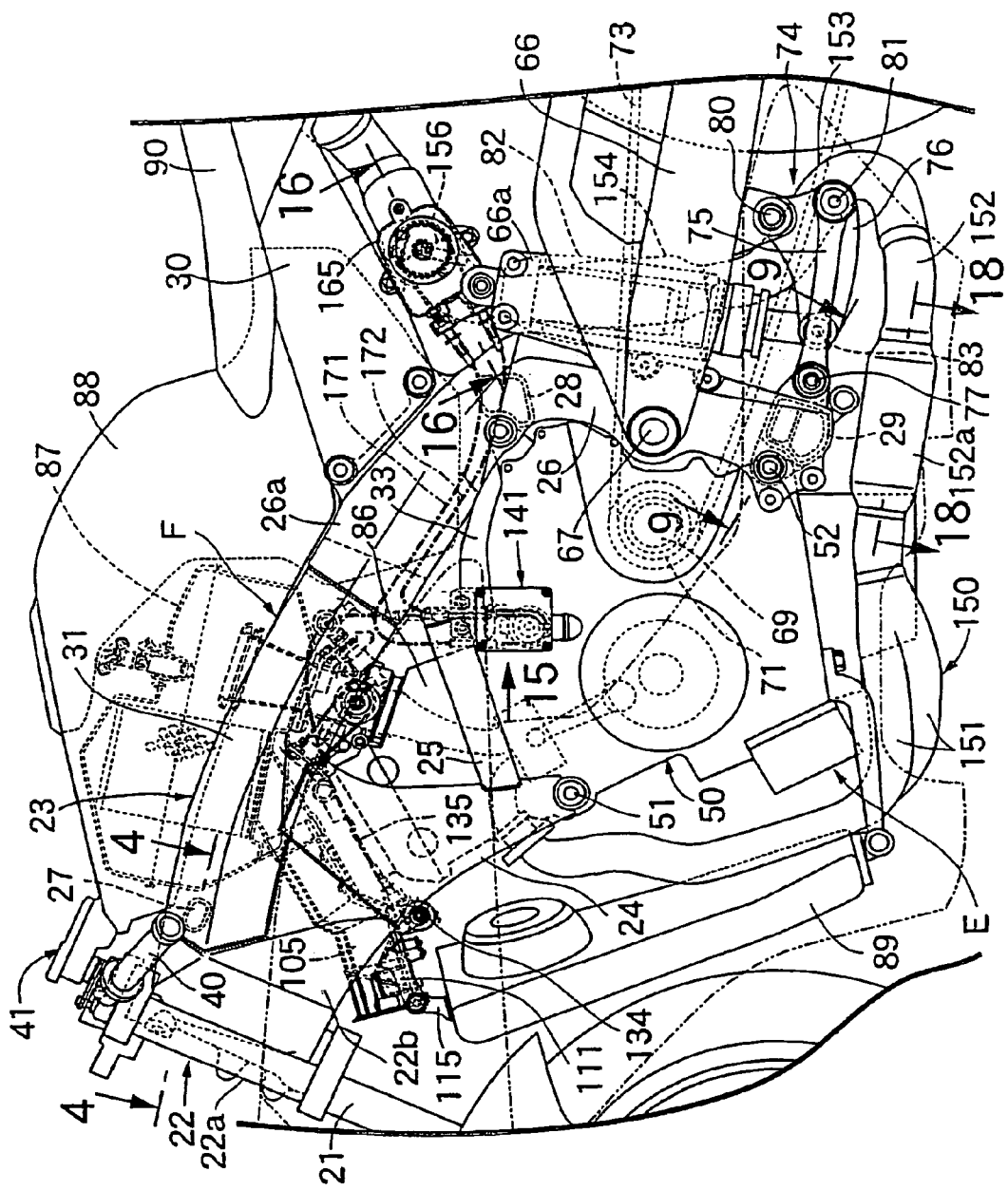
FIG. 2 is an enlarged view of a portion of FIG. 1.
Figure 3:
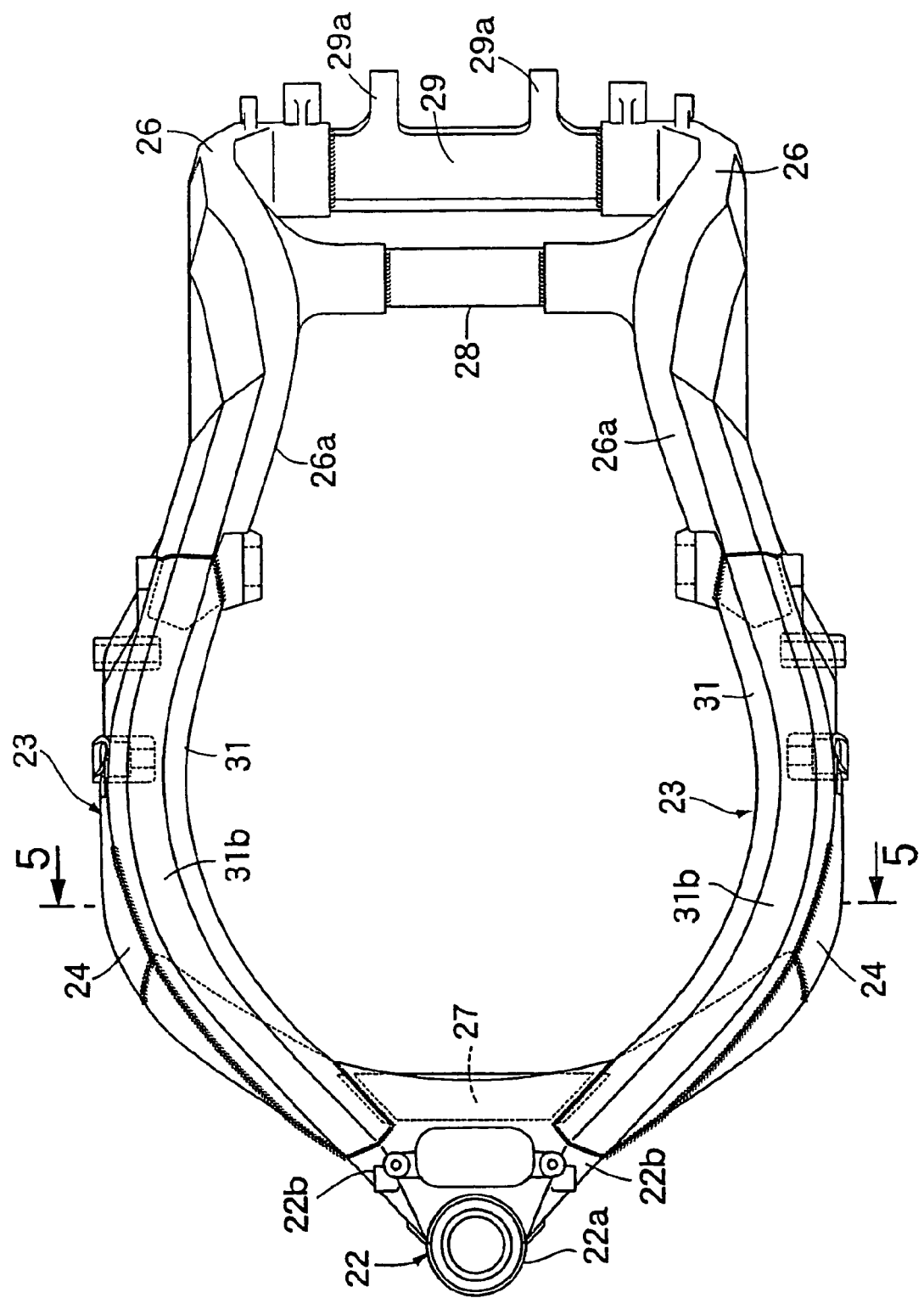
FIG. 3 is a plan view of a front portion of a vehicle body frame according to an embodiment of the present invention.
Figure 4:
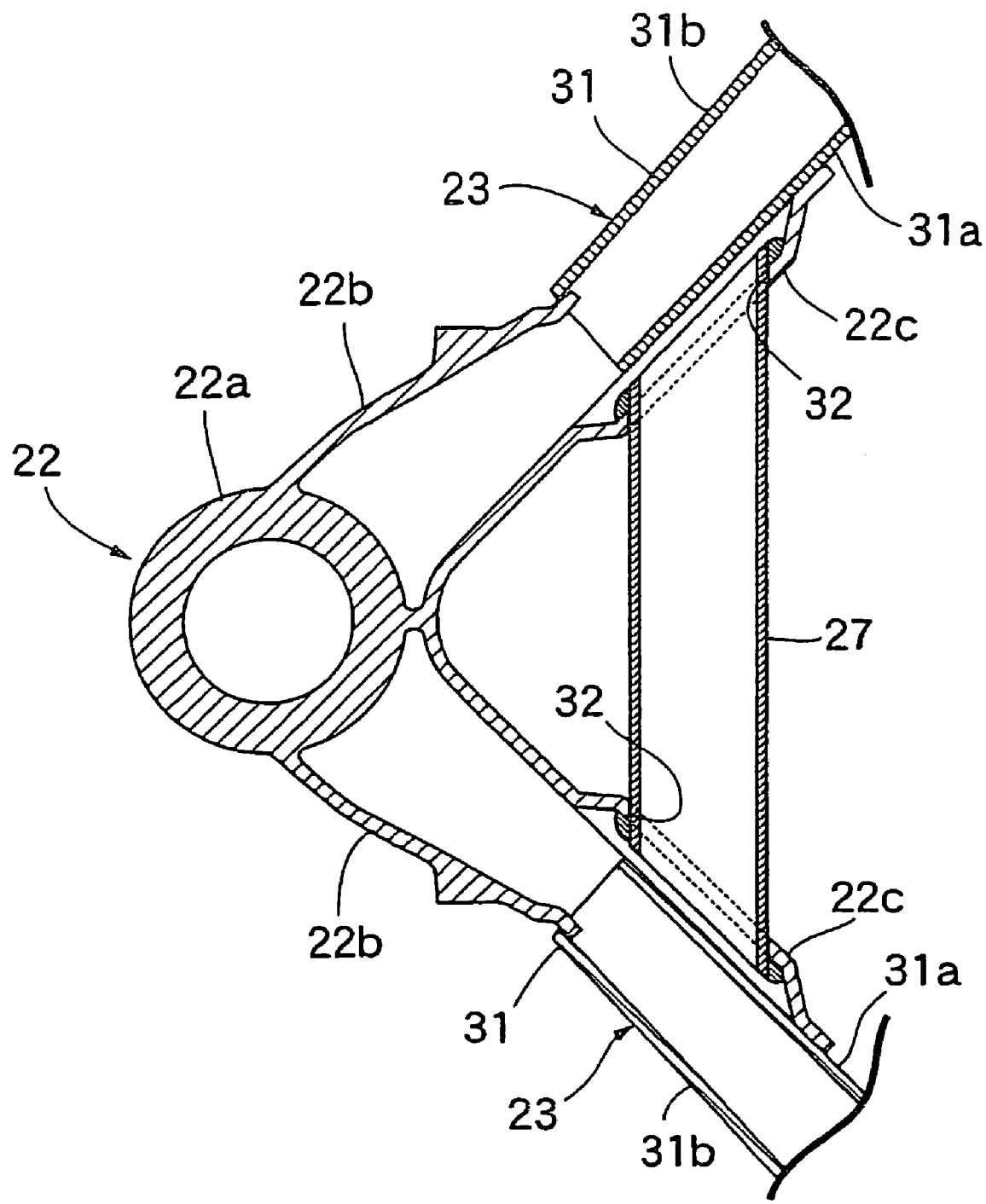
FIG. 4 is an enlarged sectional view of the front portion of the vehicle body frame taken along line 4-4 in FIG. 2.
Figure 5:
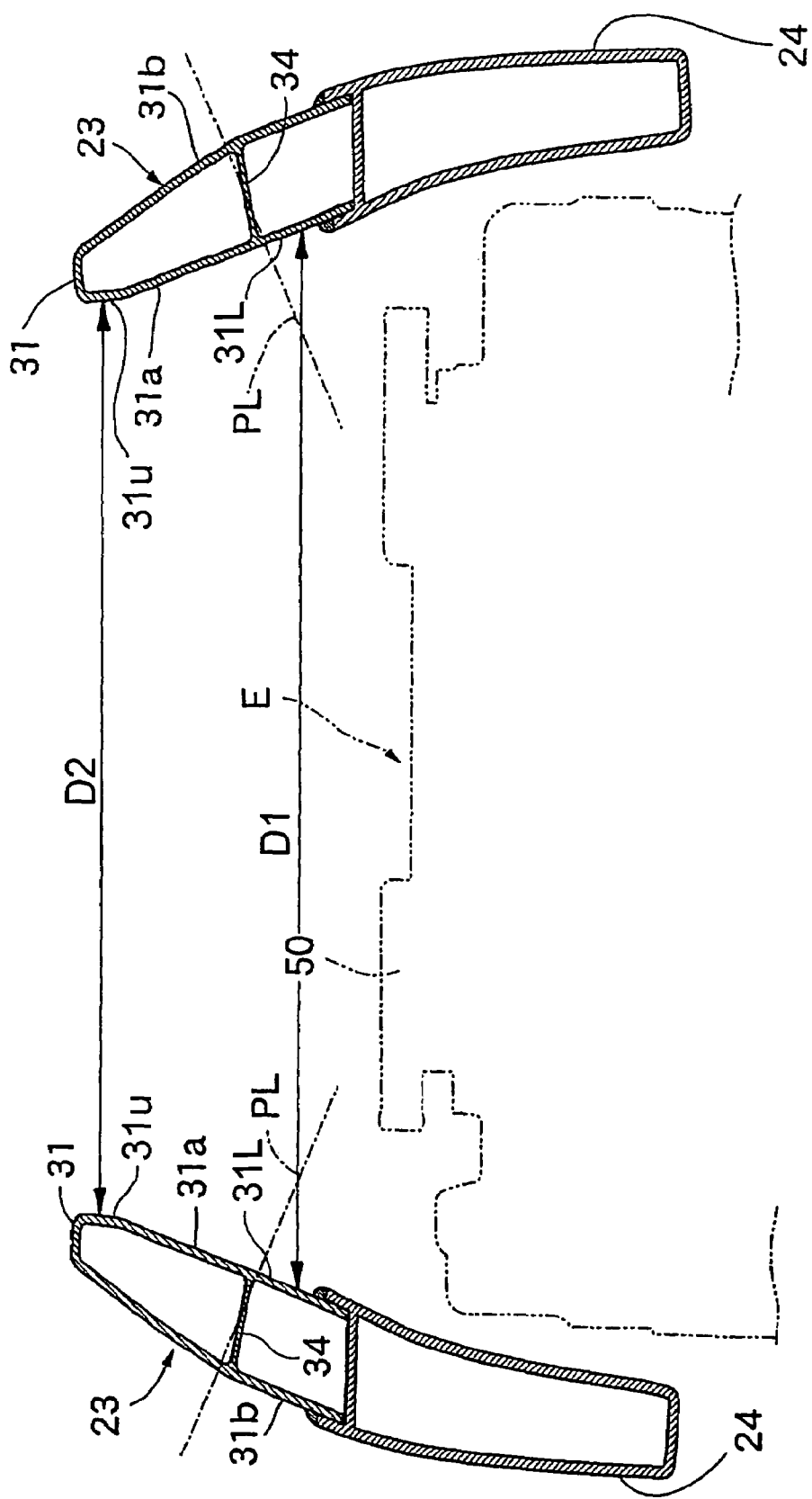
FIG. 5 is a vertical sectional view of the pipe members and engine hangars taken along line 5-5 in FIG. 3.
Figure 6:
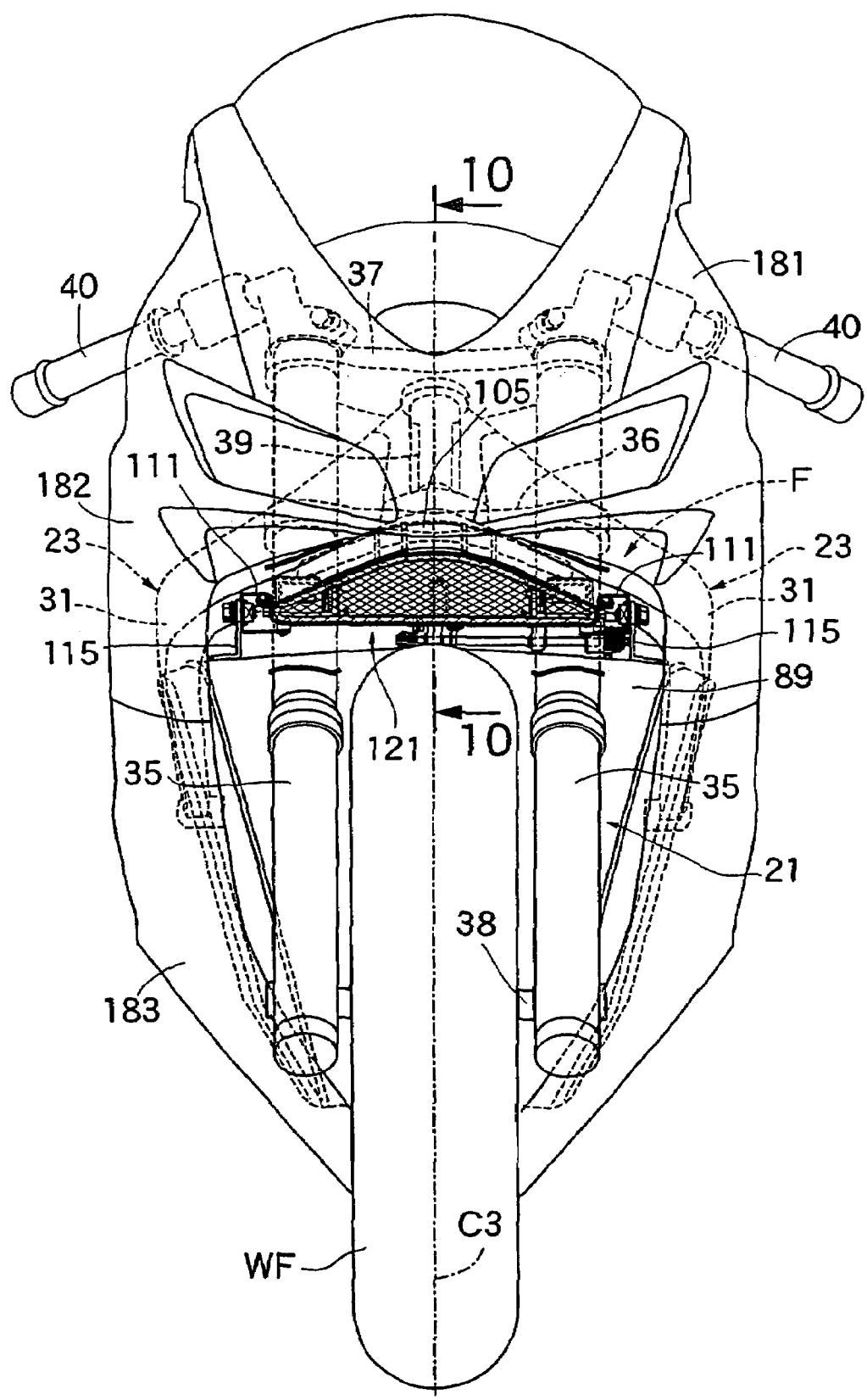
FIG. 6 is an enlarged view as seen in the direction of arrow 6 in FIG. 1.
Figure 7:
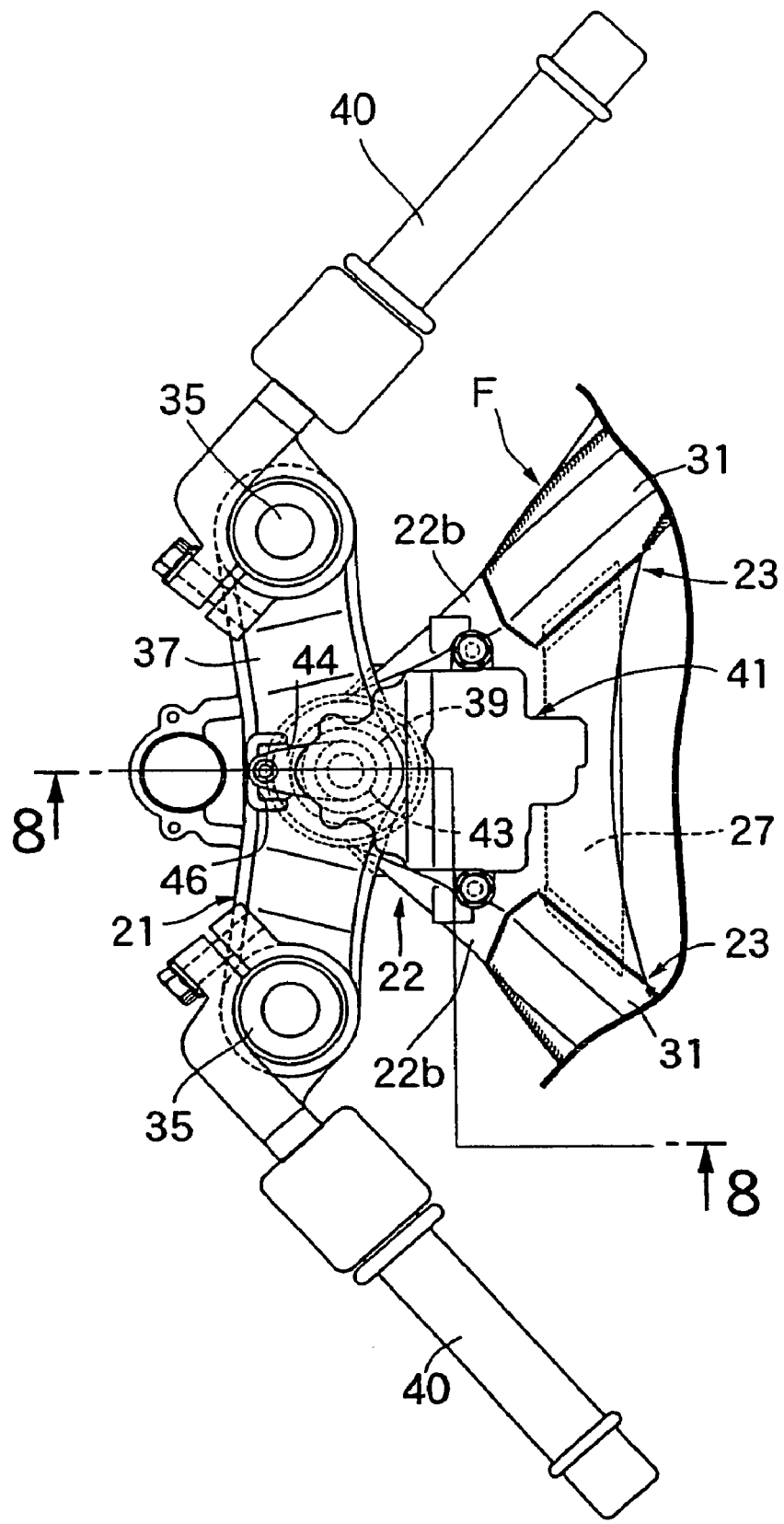
FIG. 7 is an enlarged view as seen in the direction of arrow 7 in FIG. 1.
Figure 8:
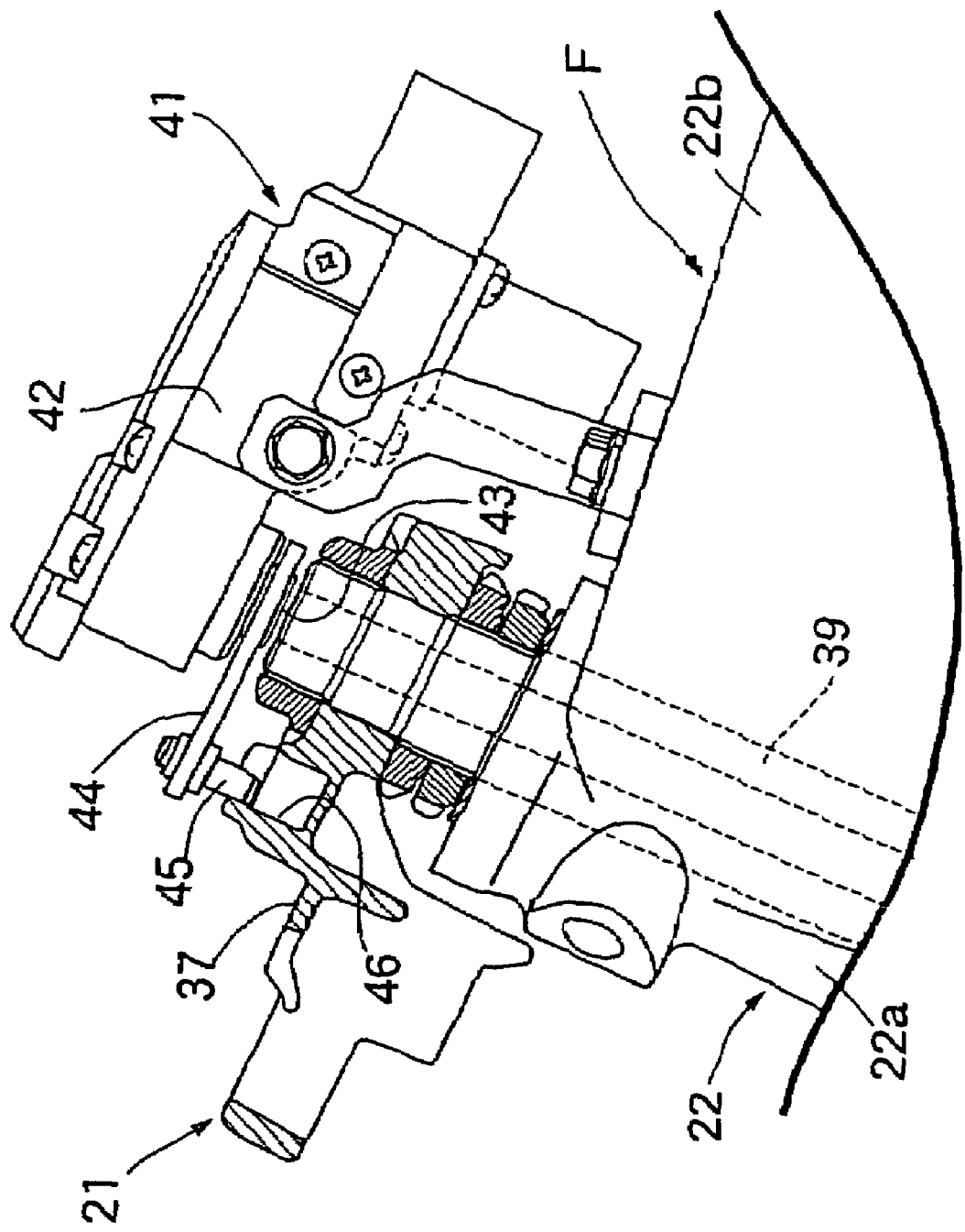
FIG. 8 is a sectional view taken along line 8-8 in FIG. 7.
Figure 9:
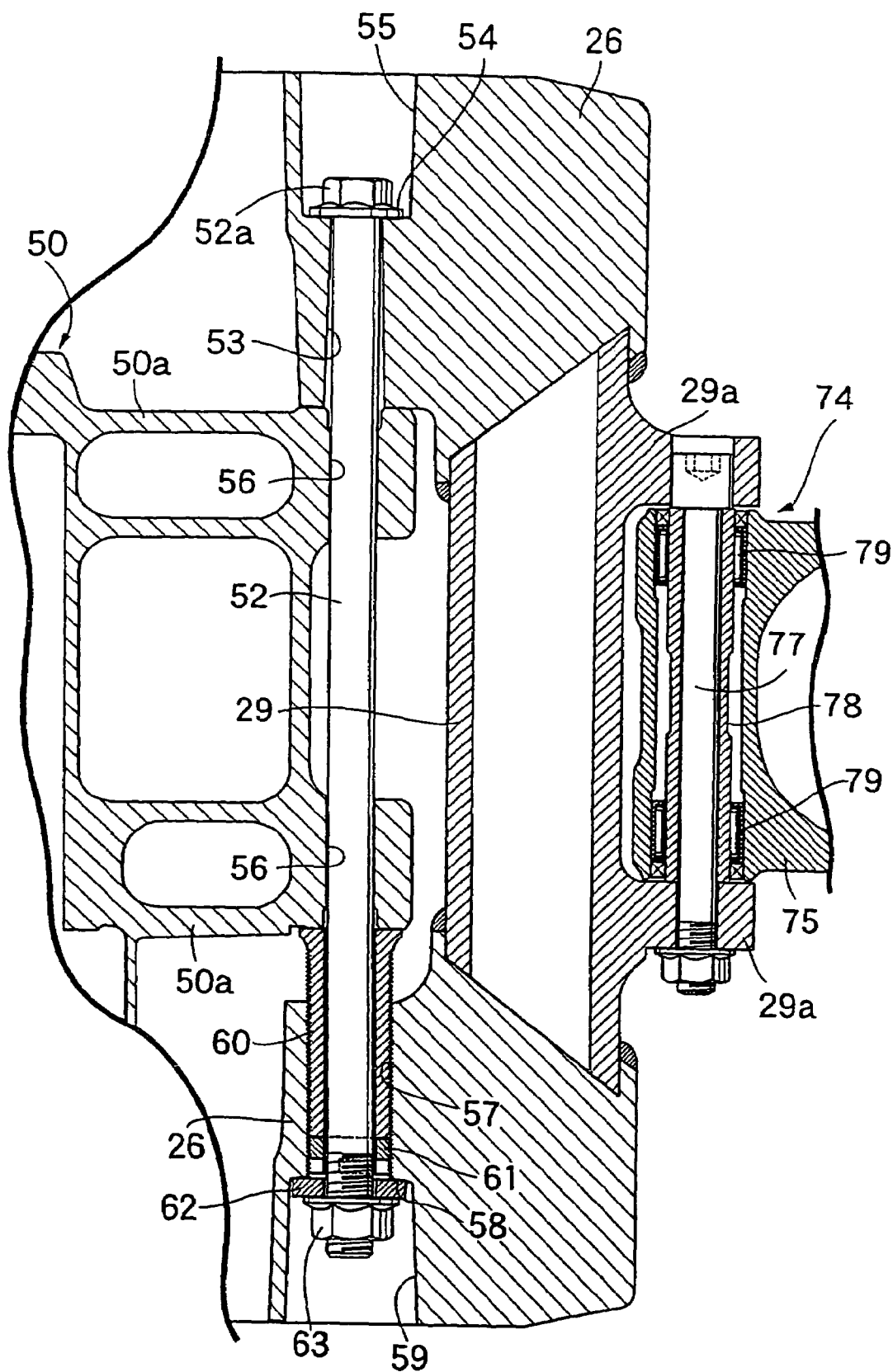
FIG. 9 is a sectional view taken along line 9-9 in FIG. 2.
Figure 10:
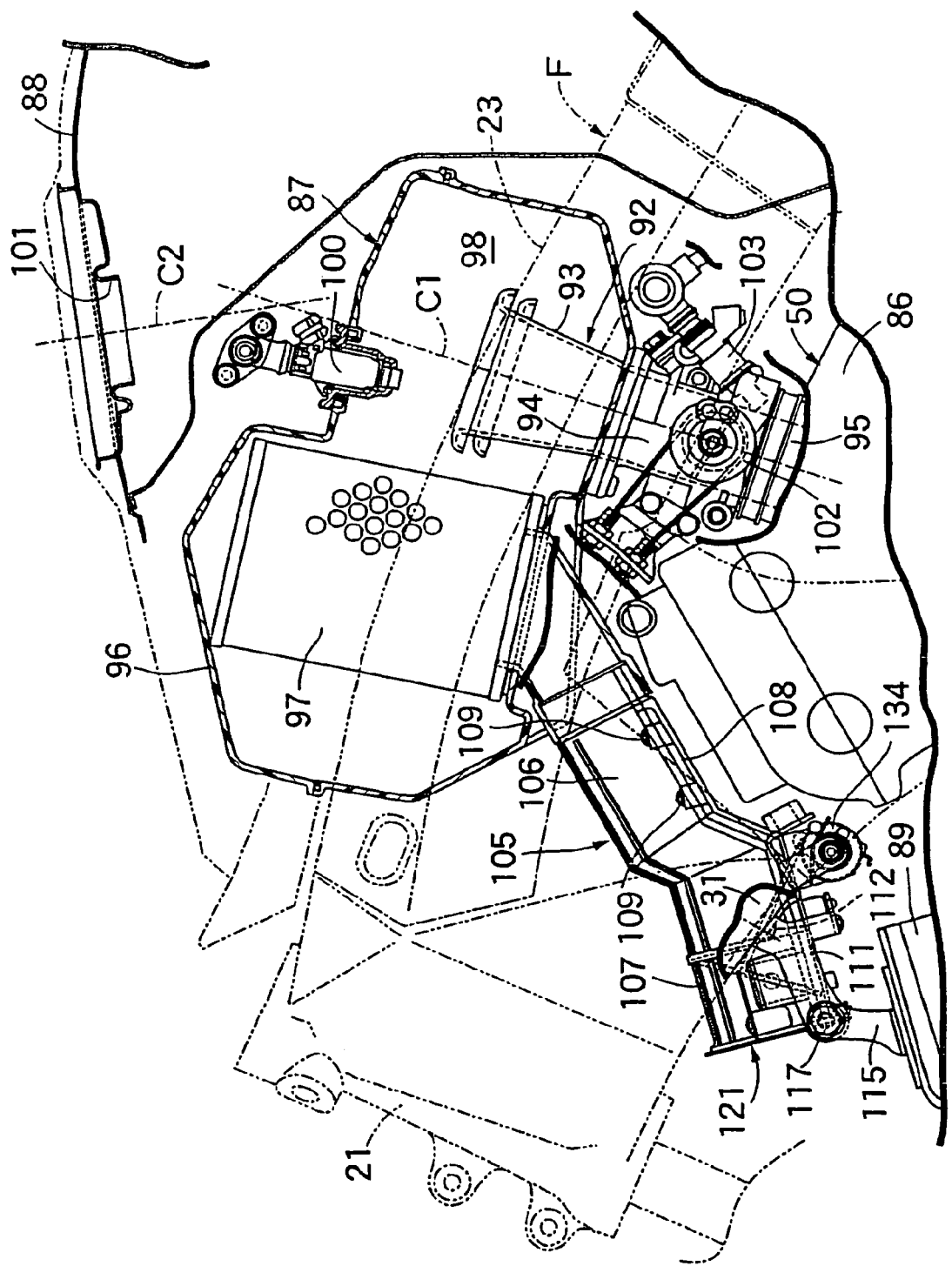
FIG. 10 is a sectional view taken along line 10-10 in FIG. 6.

The present invention will hereinafter be described with reference to the accompanying drawings. FIG. 1 is a side view of a motorcycle according to an embodiment of the present invention. FIG. 2 is an enlarged view of a portion of FIG. 1. FIG. 3 is a plan view of a front portion of a vehicle body frame according to an embodiment of the present invention. FIG. 4 is an enlarged sectional view of the front portion of the vehicle body frame taken along line 4-4 in FIG. 2. FIG. 5 is a sectional view taken along line 5-5 in FIG. 2. FIG. 6 is an enlarged view as seen in the direction of arrow 6 in FIG. 1. FIG. 7 is an enlarged view as seen in the direction of arrow 7 in FIG. 1. FIG. 8 is a sectional view taken along line 8-8 in FIG. 7. FIG. 9 is a sectional view taken along line 9-9 in FIG. 2. FIG. 10 is a sectional view taken along line 10-10 in FIG. 6.

First, in FIGS. 1 to 3, a body frame F in this motorcycle includes a head pipe 22 which supports a front fork 21 steerably, the front fork 21 supporting a front wheel FW through a shaft, a pair of right and left main frames 23 extending backward and downward from the head pipe 22, a pair of engine hangers 24 welded to front portions of both main frames 23 and extending downward from the main frames 23, connecting pipes 25 for connection between lower portions of both engine hangers 24 and support plates 33 secured to rear portions of the main frames 23, a pair of right and left pivot plates 26 extending downward from the rear portions of the main frames 23, a first cross pipe 27 disposed bridgewise between the front portions of the main frames 23, a second cross pipe 28 disposed bridgewise between upper portions of both pivot plates 26, a third cross pipe 29 disposed bridgewise between lower portions of both pivot plates 26, and a pair of seat rails 30 extending backward and upward and connected to the rear portions of both main frames 23.

In FIG. 4, the head pipe 22 is integrally provided with a cylindrical portion 22a whereby the front fork 21 is can be steered and supported, and a pair of right and left gussets 22b extending rearward and downward from the cylindrical portion 22a. The main frames 23 include the gussets 22b, pipe members 31 welded at front ends thereof to the gussets 22b, and pipe portions 26a integral with the pivot plates 26 and welded to rear ends of the pipe members 31.

The first cross pipe 27 are disposed spanwise between the front portions of the main frames 23 with a pair of mounting holes 32 formed coaxially in inner walls of the main frames 23. Both ends of the first cross pipe 27 are inserted into the mounting holes 32 and are welded to the inner walls of both main frames 23. Integral with both gussets 22b of the head pipe 22 are a pair of extending portions 22c extending rearward so as to be positioned inside front inner walls of the pipe members 31. The extending portions 22c form front inner walls of the main frames 23. In the extending portions 22c there are formed the mounting holes 32 which permit both ends of the first cross pipe 27 to be inserted therein so that the both ends are opposed to the front inner walls of the pipe members 31. Both ends of the first cross pipe 27 are welded to outer surfaces of both extending portions 22c.

As seen in FIG. 5, the pipe members 31 are formed so as to have a prismatic shape by a known extrusion or drawing method, e.g., by using an ingot of an aluminum alloy for example. A rib 34 that vertically partitions the interior of the pipe member 31 is provided between vertically intermediate inner wall portions of each pipe member 31. A lower portion of each pipe member 31 to which the associated engine hanger 24 is welded includes a downward cut-out, i.e., toward the engine hanger 24.

Each of the pipe members 31 is curved in an outwardly convex shape with respect to a longitudinal centerline of said motorcycle frame F at a longitudinally intermediate position of each pipe member when viewed from a top view (FIG. 3), and is curved in an upwardly convex shape with respect to the longitudinal centerline of said motorcycle frame F at the longitudinally intermediate position of each pipe member when viewed from a side view (FIG. 1). FIG. 5 is a sectional view of the pipe members and engine hangars taken along line 5-5 in FIG. 3. Further, as can be seen in FIG. 5, a distance D1 between lower portions 31L at the longitudinally intermediate position of each pipe member 31 is greater than a distance D2 between than upper portions 31U at the longitudinally intermediate position of each pipe member 31. As can be seen in FIGS. 2, 3, and 5 each of the pipe members 31 includes an inner wall 31a and an outer wall 31b; the inner wall 31a is formed with a substantially continuous inwardly and downwardly facing concave surface an overall length of each pipe member 31 and with respect to the vertical direction of each pipe member 31. Further, as can be seen in FIGS. 3, 4, and 5, the outer wall 31b of each pipe member 31 is formed with a substantially continuous outwardly and upwardly facing convex surface and is substantially parallel with the inner wall 31a. Each pipe member 31 is bent in a plane PL orthogonal to the inner wall 31a so as to be convex outwards in a sideward direction at a longitudinally intermediate portion of the pipe member 31. After the bending work, both pipe members 31 are connected contiguously to the gussets 22b while tilting so as to approach each other as they extend upward.

In FIG. 6, the front fork 21 is provided with a pair of cushion units 35 which extend vertically on both right and left sides of the front wheel WF, a bottom bridge 36 which provides a connection between both cushion units 35 at a position above the front wheel WF, and a top bridge 37 which provides a connection between upper portions of both cushion units 35. An axle 38 of the front wheel WF is supported between lower portions of both cushion units 35.

As seen in FIGS. 7 and 8, on a central rear side between both cushion units 35, a steering shaft 39 is disposed between the bottom bridge 36 and the top bridge 37 in parallel with both cushion units 35. The steering shaft 39 is supported rotatably by the cylindrical portion 22a of the head pipe 22. Above the bottom bridge 36, a pair of right and left, separate, steering bar handles 40 are connected to upper end portions of both cushion units 35. Further, a steering damper 41 is disposed between a front end portion of the body frame F, i.e., the head pipe 22, and the top bridge 37 of the front fork 21.

The steering damper 41 is provided with a housing 42 which houses therein a hydraulic buffer mechanism (not shown) which is fixedly supported on the head pipe 22, a pivot shaft 43 which is disposed coaxially above the steering shaft 39 which is pivotably supported by the housing 42, an arm 44 fixed at a base end portion to the pivot shaft 43 and extending forward, an elastic roller 45 which is journaled at a front end of the arm 44, and a concave portion 46 which is formed in a central upper surface of the top bridge 37 to accommodate an outer periphery surface of the elastic roller 45 fitted therein for frictional contact. Pivotal oscillations around the axis of the steering shaft 39, which is transmitted from the front wheel WF side to the top bridge 37, are damped through the arm 44 by the hydraulic buffer mechanism disposed within the housing 42.

Referring again to FIG. 2, an engine body 50 of a multi-cylinder engine E, which includes cylinders, e.g., four cylinders disposed side by side in the width direction of the body frame F, is supported by the lower portions of both engine hangers 24 and also by the upper and lower portions of both pivot plates 26. The engine 50 is secured to the lower portions of the engine hangers 24 with bolts 51 which are used in a pair on each of right and left sides.

In FIG. 9, in supporting the engine body 50 at the lower portions of the pair of pivot plates 26 which are disposed on both sides of the engine body 50, an insertion hole 53 for insertion therein of a mounting bolt 52 and a first retaining portion 54 which surrounds an outer end of the insertion hole 53 are formed in the lower portion of one of both pivot plates 26, e.g., in this embodiment the pivot plate 26 is disposed on the right side when looking at the front in the advancing direction of the motorcycle. More specifically, in the lower portion of one pivot plate 26 there are coaxially formed the insertion hole 53 which is open to an inner surface of the lower portion and a first insertion hole 55 which is larger in diameter than the insertion hole 53 and which is open to an outer surface. The first retaining portion 54 is formed between the outer end of the insertion hole 53 and an inner end of the first insertion hole 55, as an annular stepped portion that faces the first insertion hole 55 side.

In the engine body 50, a pair of support arm portions 50a are integrally formed between both pivot plates 26 and spacedly in the axial direction of the mounting bolt 52. A pair of through holes 56 for insertion therethrough of the mounting bolt 52 are coaxially formed in the support arm portions 50a. In the lower portion of the other pivot plate 26 there are formed a tapped hole 57 that is coaxial with the insertion hole 53 and a second retaining portion 58 that surrounds an outer end of the tapped hole 57. More specifically, in the lower portion of the other pivot plate 26 there are coaxially formed the tapped hole 57 which is open to an inner surface of the lower portion and a second insertion hole 59 which is larger in diameter than the tapped hole 57 and which is open to an outer surface. The second retaining portion 58 is formed between the outer end of the tapped hole 57 and an inner end of the second insertion hole 59, as an annular stepped portion that faces the second insertion hole 59 side.

A cylindrical bolt 60, whose one end is abutted against the engine body 50, is threaded into the tapped hole 57. More specifically, with one support arm portion 50a abutted against the inner surface of one pivot plate 26, the cylindrical bolt 60 is threaded into the tapped hole 57 so that one end thereof is brought into abutment against the other support arm portion 50a. A cylindrical stop bolt 61 is threaded into the tapped hole 57 for abutment against an opposite end of the cylindrical bolt 60 to prevent loosening of the bolt 60. With the engine body 50 held between the inner surface of one pivot plate 26 and one end of the cylindrical bolt 60, the cylindrical bolt 60 and the stop bolt 61 are threaded into the tapped hole 57 so that the opposite end of the cylindrical bolt 60 and the stop bolt 61 are positioned inside the second retaining portion 58.

The mounting bolt 52 is inserted through all of insertion hole 53, both through holes 56 formed in the engine body 50, cylindrical bolt 60, stop bolt 61 and tapped hole 57. A larger-diameter head portion 52a formed at one end of the mounting bolt 52 is engaged with one of the first and second retaining portions 54, 58, and a nut 63 for engagement with the other of the first and second retaining portions 54, 58 is threaded into an opposite end of the mounting bolt 52. In this embodiment, the opposite end of the mounting bolt 52 whose larger-diameter head portion 52a is engaged with the first retaining portion 54 projects from the tapped hole 57. At the projecting portion from the tapped hole 57, the nut 63 that is threaded into the opposite end of the mounting bolt 52, is engaged with the second retaining portion 58 through a washer 62.

The support structure of the engine body 50 for the upper portions of both pivot plates 26 is basically the same as the support structure for the lower portions of the pivot plates 26 described above, and therefore a detailed explanation thereof will here be omitted. At a vertically intermediate position of each of the pivot plates 26, a front end of a swing arm 66 is supported pivotably through a pivot shaft 67, and an axle 68 of a rear wheel WR is rotatably supported at a rear end of the swing arm 66. Power from an output shaft 69 of a transmission disposed within the engine body 50 is transmitted to the rear wheel WR through a chain drive means 70. The chain drive means 70 is composed of a driving sprocket 71 that is fixed onto the output shaft 69, a driven sprocket 72 fixed to the rear wheel WR, and an endless chain 73 entrained on the sprockets 71 and 72. The chain drive means 70 is disposed on the left side of the engine E when looking at the front in the advancing direction of the motorcycle.

A link mechanism 74 is disposed between the swing arm 66 and the third cross pipe 29 that provides a connection between the lower portions of both pivot plates 26. The link mechanism 74 includes a first link 75 which is pivotable about the axis of a first connecting shaft 77 parallel to the pivot shaft 67 and which is connected at one end thereof to the third cross pipe 29, and a second link 76 which is connected to the lower portions of the swing arm 66 pivotably about the axis of a second connecting shaft 80 parallel to the first connecting shaft 77 and which is connected to an opposite end of the first link 75 through a third connecting shaft 81 parallel to the first and second connecting shafts 77, 80.

Integral with the third cross pipe 29 are a pair of journal portions 29*a* that project rearward at two longitudinally spaced positions. A collar 78 is mounted on the first connecting shaft 77 that is mounted between both journal portions 29*a*, and one end portion of the first link 75 is supported through a pair of roller bearings 79. An opposite end portion of the first link 75 is connected to a rear portion of the second link 76 through the third connecting shaft 81. An upper end of a rear cushion unit 82 is connected to a bracket 66*a* provided at a front end of the swing arm 66, while a lower end of the rear cushion unit 82 is connected to a front portion of the second link 76 through a fourth connecting shaft 83.

As seen in FIG. 10, an air cleaner 87 for purifying air fed to the engine E is disposed above a cylinder head 86 in the engine body 50 so as to be positioned behind the head pipe 22 in the body frame F. Further, a fuel tank 88 that covers rear and upper portions of the air cleaner 87 is mounted on both main frames 23 in the body frame F, and a radiator 89 is disposed in front of the engine body 50. As shown in FIG. 2, a main seat 90 for a rider to sit thereon is supported on the seat rails, 30 at a position behind the fuel tank 88, and a pillion seat 91 for a passenger is supported on the seat rails 30 at a position spaced rearward from the main seat 90.

Intake air passages 92 extending linearly so as to introduce purified air from the air cleaner 87 disposed above the cylinder head 86 are connected cylinder by cylinder to an upper side wall of the cylinder head 86. The intake passages 92 are each provided with a funnel 93 having an open upper end inserted into the air cleaner 87 and also provided with a throttle body 94 connected to a lower end of the funnel 93. The throttle body 94 is connected to the upper side wall of the cylinder head 86 through an insulator 95.

The air cleaner 87 includes a cleaner case 96 and a cylindrical cleaner element 97 secured within the cleaner case 96. Within the cleaner case 96 and around the cleaner element 97 there is formed a purified air chamber 98 into which is introduced air after being purified through the cleaner element 97. The funnels 93 disposed at upstream ends of the intake air passages 92 are attached to the cleaner case 96 in parallel so as to be open into the purified air chamber 98.

First injectors 100 for the injection of fuel during high-speed rotation of the engine E are attached to the cleaner case 96 in the air cleaner 87 cylinder by cylinder in the engine. The first injectors 100 are disposed ahead of centerlines C1 of the intake air passages 92 and are attached to the cleaner case 96 so as to have axes inclined relative to the centerlines C1. A fuel pump (not shown) is disposed within the fuel tank 88 for feeding fuel to the first injectors 100.

An oil supply port 101 is formed in a front portion of the fuel tank 88. The first injectors 100 are disposed ahead of a centerline C2 of the oil supply port 101. In a projection diagram onto a plane parallel to the centerline C2 of the oil supply port 101 and the centerlines C1 of the intake air passages 92, the first injector 100 are attached to the cleaner case 96 so that their upper portions are positioned ahead of an intersecting point P of both centerlines C1 and C2. Within each throttle body 94 in each intake air passage 92 there is disposed a throttle valve (not shown) for controlling the amount of intake air flowing through the intake air passage 92, and a throttle drum 102 connected to the throttle valve is disposed sideways of the throttle body 94. On the engine E side with respect to the throttle valve and sideways behind the throttle bodies 94 there are mounted second injectors 103 which, during operation of the engine E, are supplied with fuel from the fuel pump disposed within the fuel tank 88 and inject the fuel.

Figure 11:
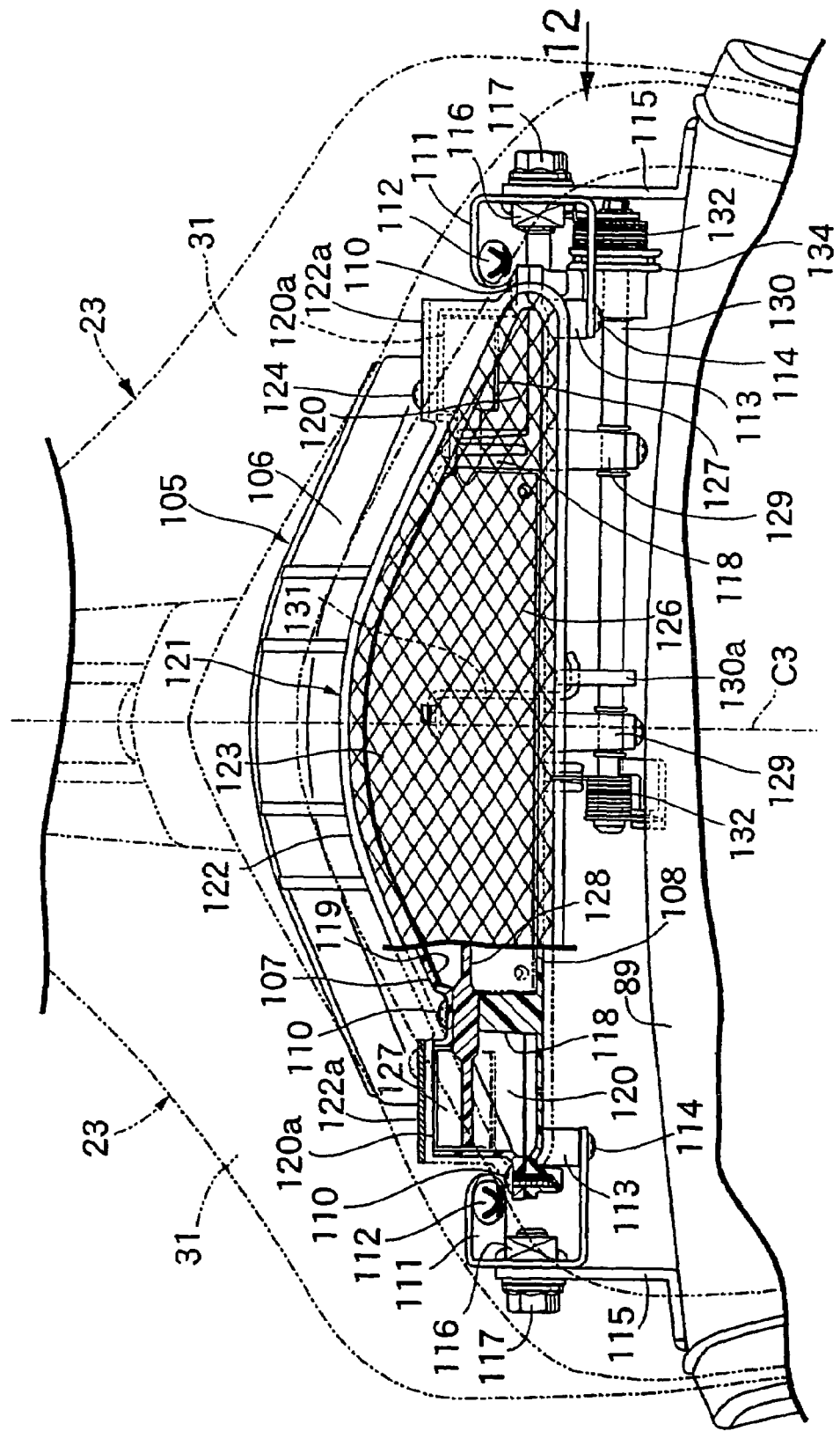
FIG. 11 is an enlarged view of a principal portion of FIG. 6.
Figure 12:
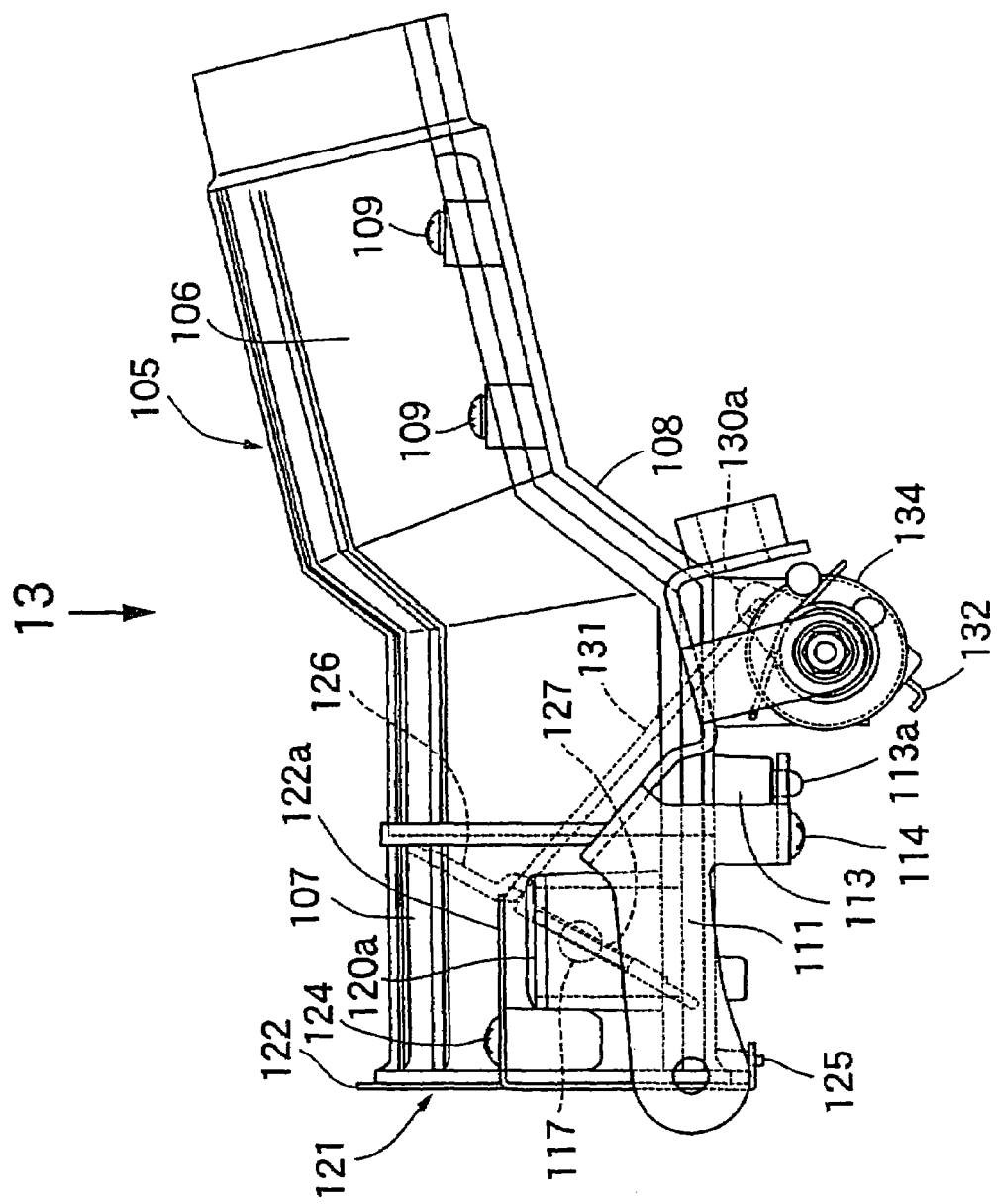
FIG. 12 is a view as seen in the direction of arrow 12 in FIG. 11.
Figure 13:
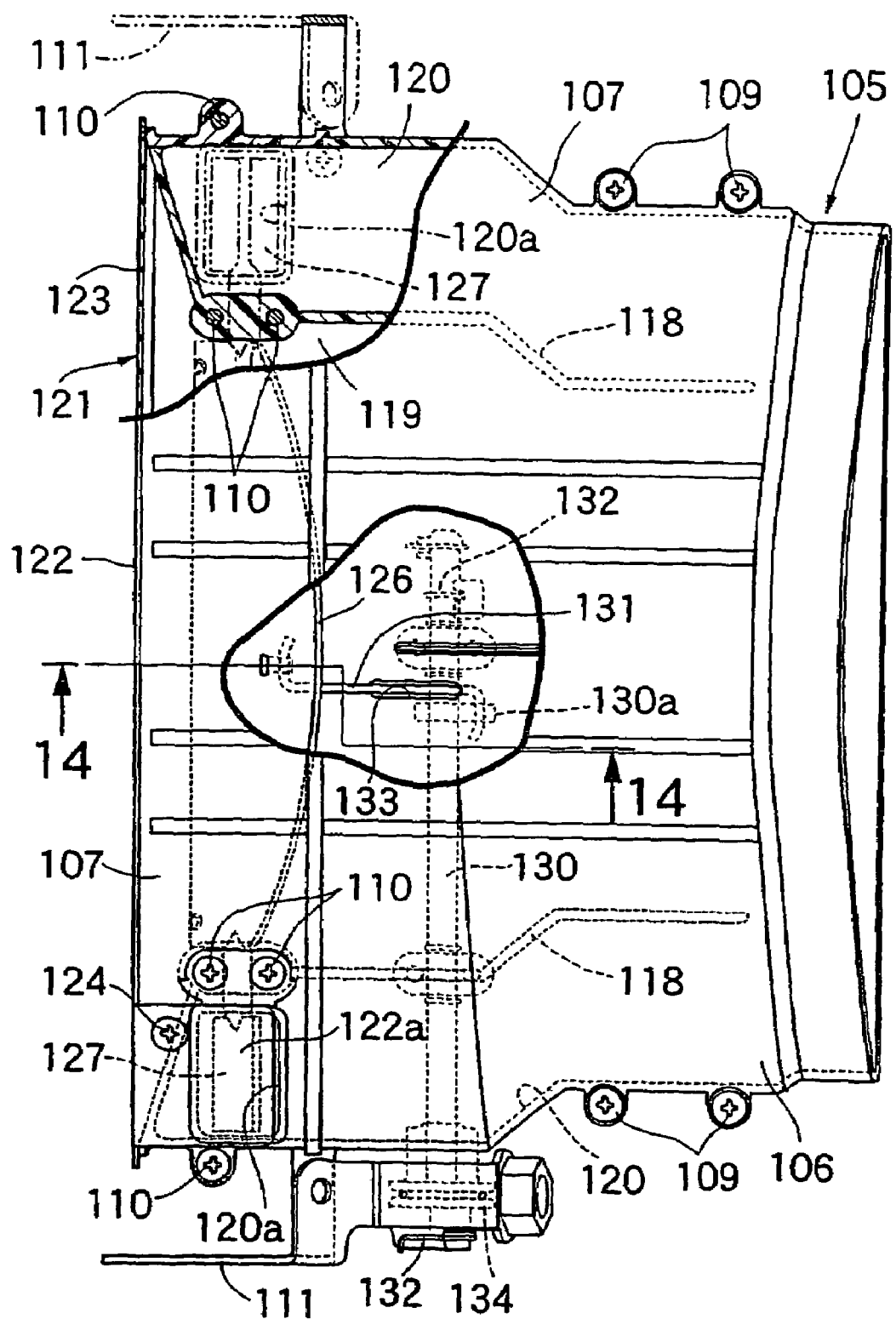
FIG. 13 is a partial, sectional plan view as seen in the direction of arrow 13 in FIG. 12.
Figure 14:
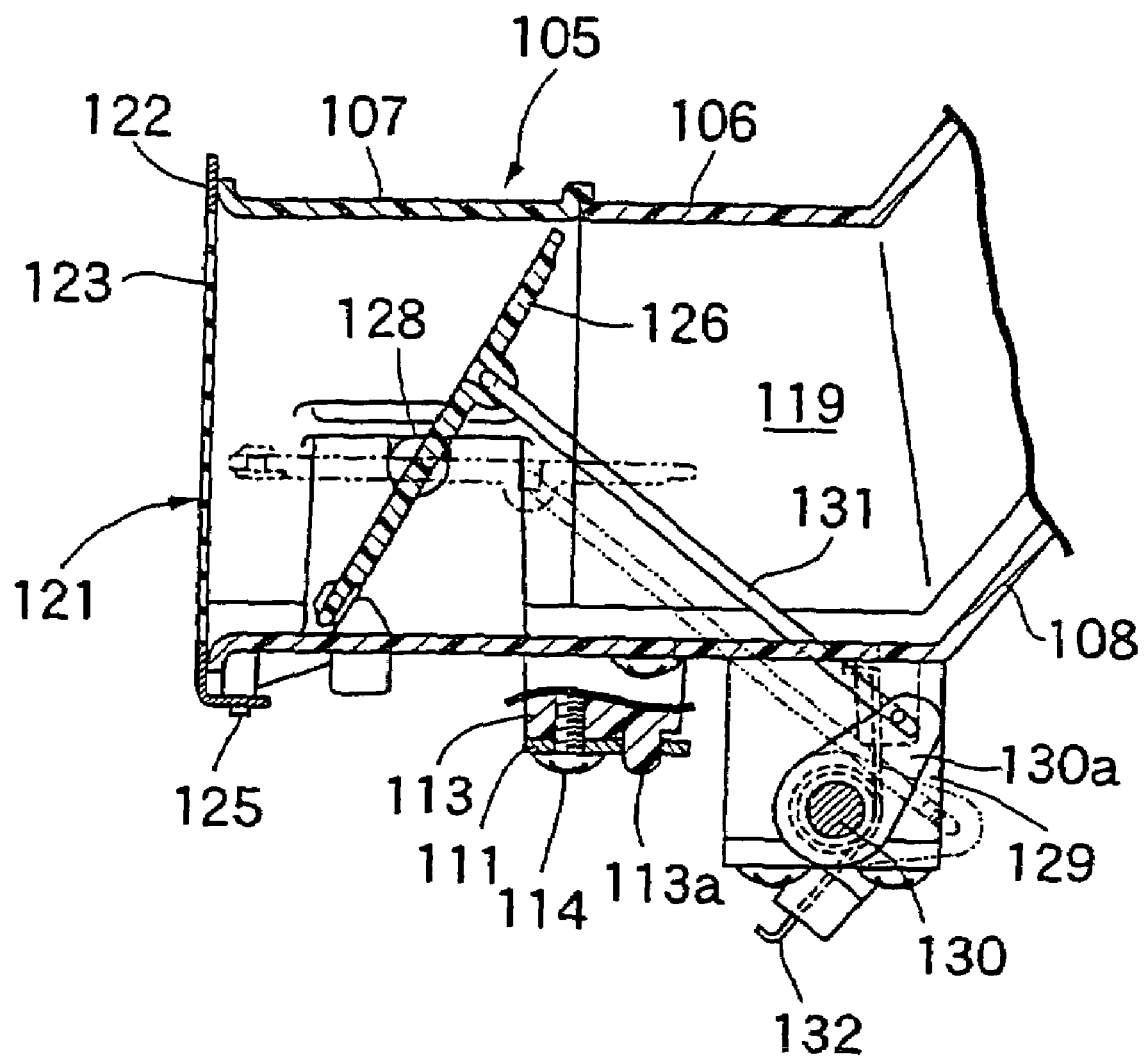
FIG. 14 is a sectional view taken along line 14-14 in FIG. 13.
Figure 15:
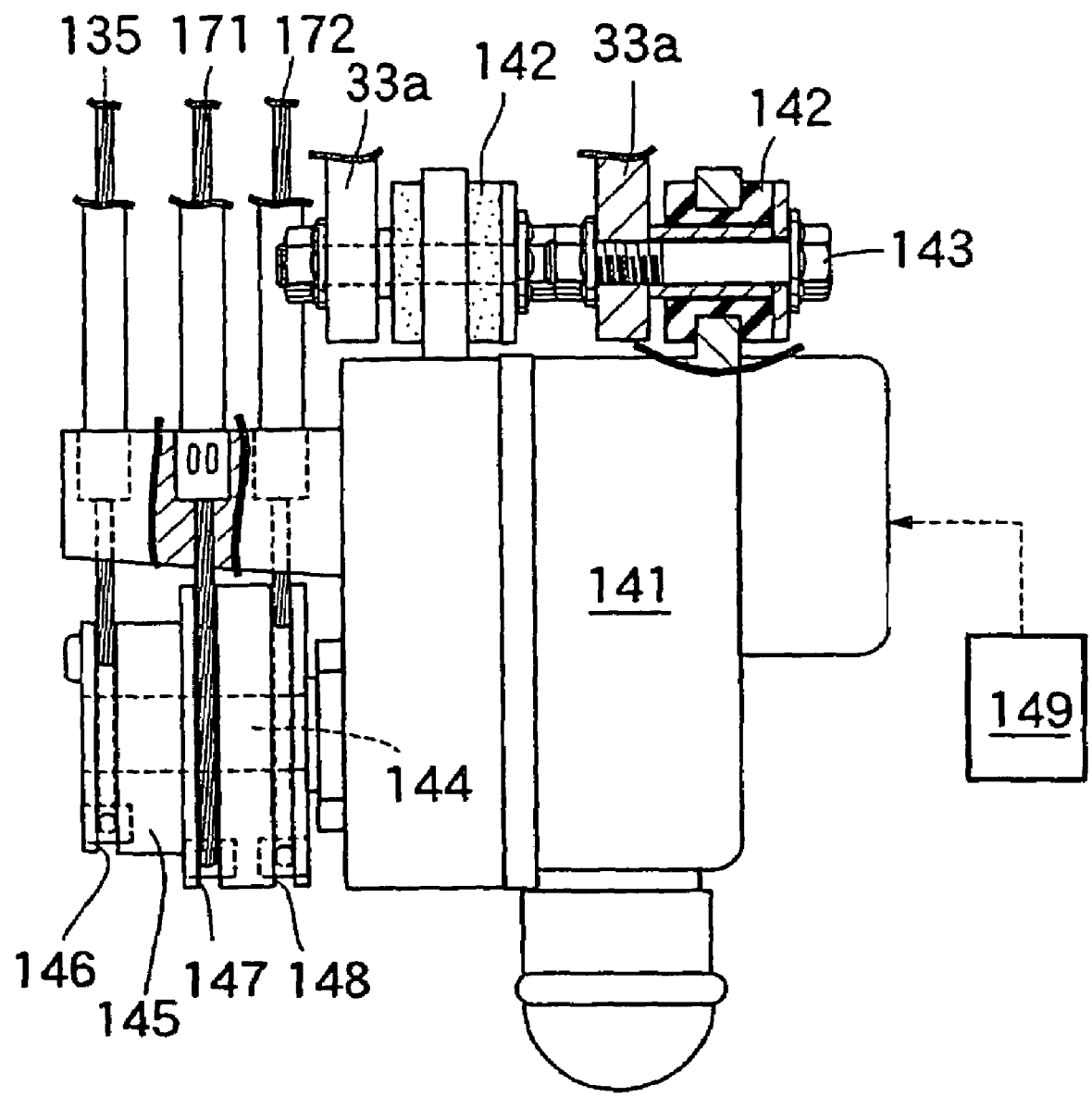
FIG. 15 is an enlarged view as seen in the direction of arrow 15 in FIG. 2.
Figure 16:
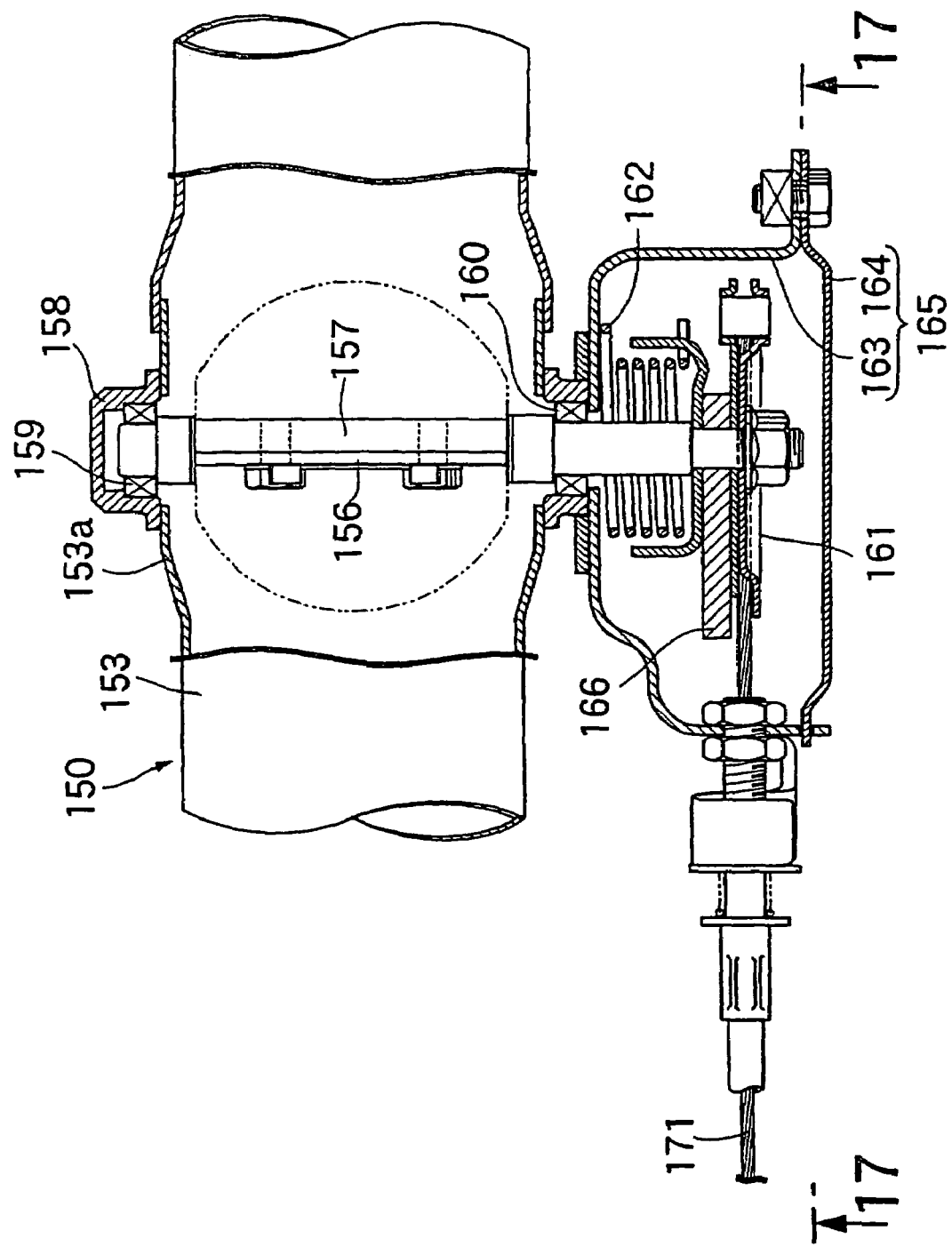
FIG. 16 is an enlarged sectional view taken along line 16-16 in FIG. 2.
Figure 17:
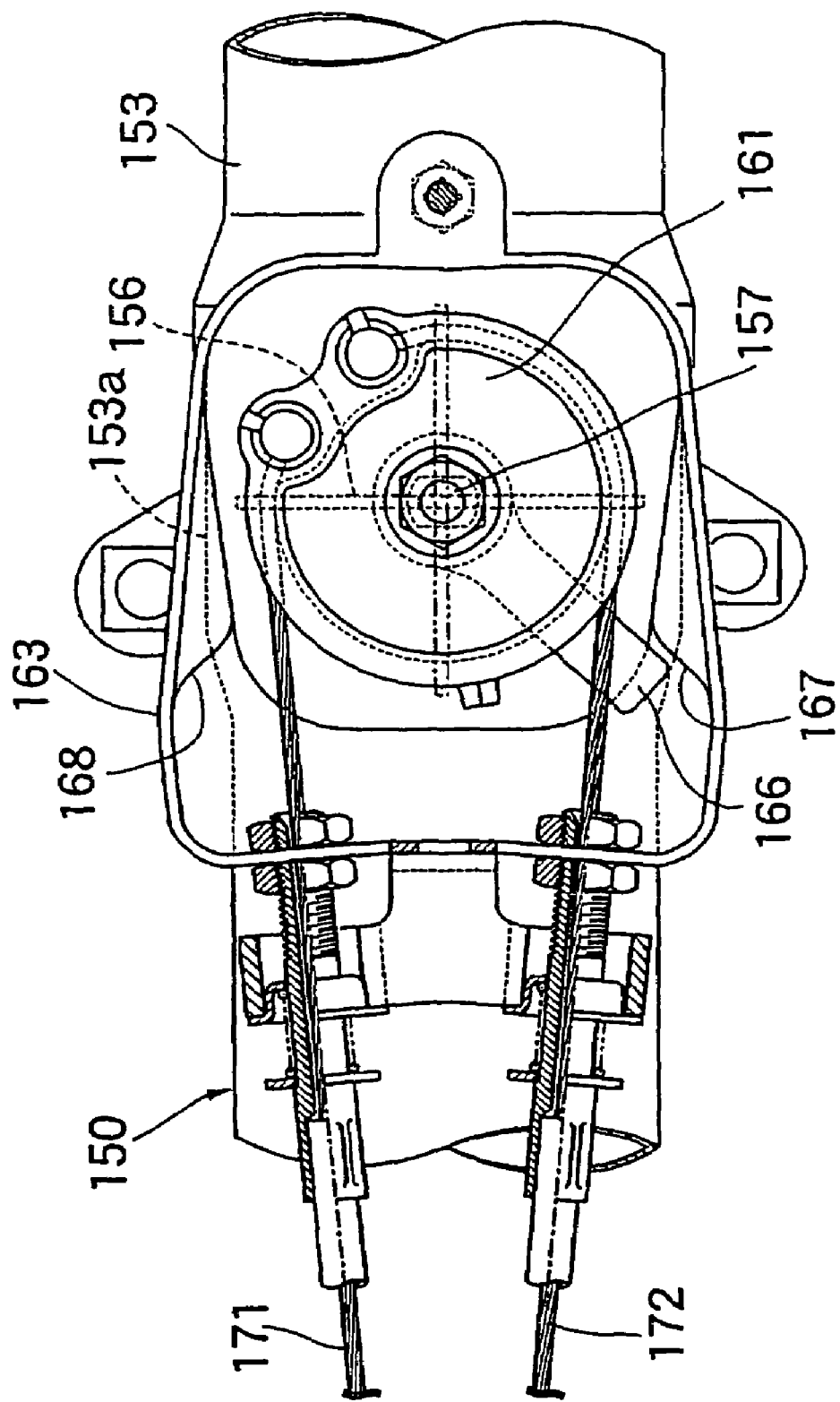
FIG. 17 is a sectional view taken along line 17-17 in FIG. 16.
Figure 18:
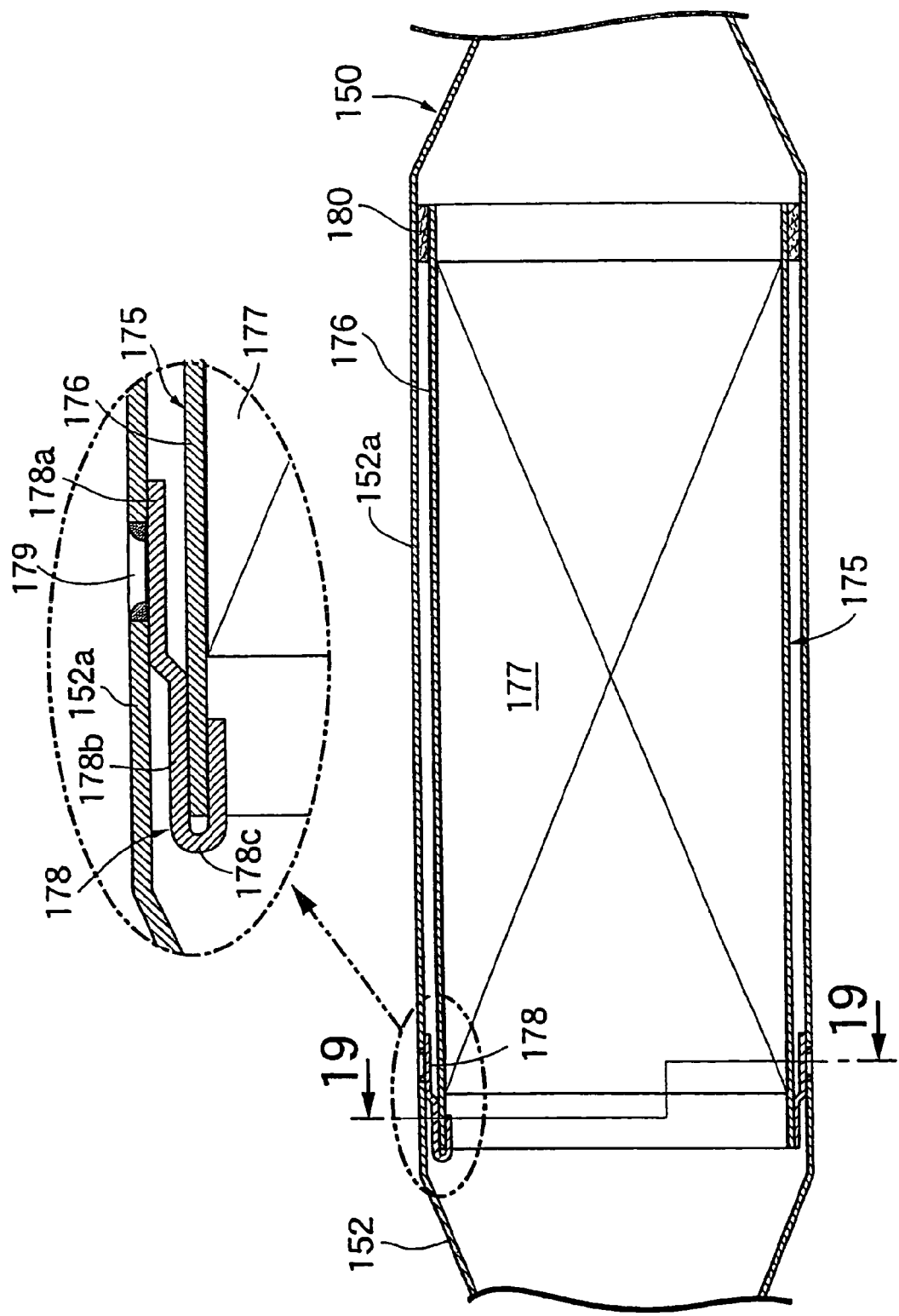
FIG. 18 is an enlarged sectional view taken along line 18-18 in FIG. 2.
Figure 19:
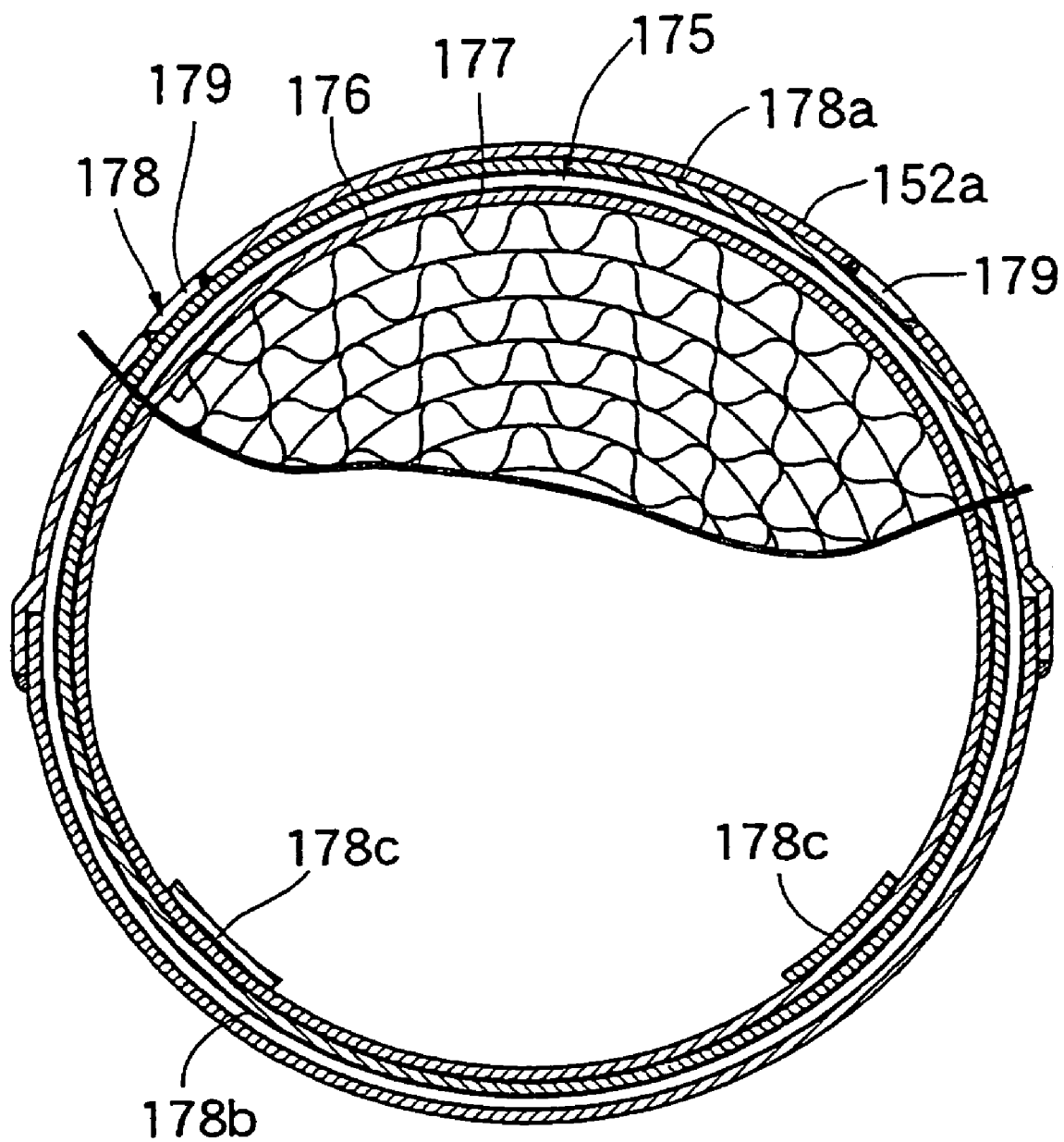
FIG. 19 is a sectional view taken along line 19-19 in FIG. 18.

FIG. 11 is an enlarged view of a principal portion of FIG. 6. FIG. 12 is a view as seen in the direction of arrow 12 in FIG. 11. FIG. 13 is a partial, sectional plan view as seen in the direction of arrow 13 in FIG. 12. FIG. 14 is a sectional view taken along line 14-14 in FIG. 13. FIG. 15 is an enlarged view as seen in the direction of arrow 15 in FIG. 2. FIG. 16 is an enlarged sectional view taken along line 16-16 in FIG. 2. FIG. 17 is a sectional view taken along line 17-17 in FIG. 16. FIG. 18 is an enlarged sectional view taken along line 18-18 in FIG. 2. FIG. 19 is a sectional view taken along line 19-19 in FIG. 18.

As seen in FIGS. 11 to 14, an intake duct 105 for introducing the outside air into the air cleaner 87 is disposed below the head pipe 22 which is mounted at the front end of the body frame F, the intake duct 105 extending forward from the air cleaner 87. A rear end portion of the intake duct 105 is inserted and fixed to the lower portion of the cleaner case 96 to introduce the outside air into the cleaner element 97 disposed within the air cleaner 87.

The intake duct 105 includes a rear duct body 106 having a substantially triangular cross-sectional shape which is raised upward at its transversely central portion and whose lower portion is open, a front duct body 107 which has substantially the same cross-sectional shape as the rear duct body 106 and which is bonded to a front portion of the rear duct body 106, and a lower lid plate 108 which closes lower open ends of the front and rear duct bodies 106, 107. When viewed from the side, the intake duct 105 is formed in such a manner that its rear portion is inclined rearwardly upward. The lower lid plate 108 is clamped to the rear duct body 106 with plural screw members 109 and is clamped to the duct body 107 with plural screw members 110.

A pair of support stays 111 are clamped with screw members 112 to front lower surfaces of the pipe members 31 which constitute a part of the main frames 23 in the body frame F, and a pair of mounting bosses 113 which are provided on both sides of a front lower portion of the intake duct 105 are clamped to the support stays 111 with a pair of screw members 114. As a result, the body frame F supports a front portion of the intake duct 105. Positioning pins 113*a*, which are inserted through the support stays 111, are projected from the mounting bosses 113.

A pair of stays 115 is extended upward from both sides of the radiator 89 that is disposed below the intake duct 105. A pair of weld nuts 116 are fixed to the support stays 111. A pair of bolts 117, each of which are inserted through the stays 115 and further through the support stays 111, are brought into threaded engagement with the weld nuts 116 and are tightened, whereby the radiator 89 is supported by the body frame F.

A pair of partition walls 118, which are abutted against lower surfaces of upper portions of the front and rear duct bodies 107, 106, are provided integrally with the lower lid plate 108 in the intake duct 105. A first intake passage 119 whose transversely central portion lies on a transversely centerline C3 of the front wheel WF, and a pair of right and left second intake passages 120 located on both sides of the first intake passage 119, are formed within the intake duct 105 so as to partition the space between the first intake passage 119 and the second intake passages 120 with use of a pair of partition walls 118. A flow area of the first intake passage 119 is set larger than the total flow area of both second intake passages 120.

Moreover, front portions of both partition walls 118 are formed in an inclined shape so as to be spaced apart from each other as they approach the front side. Front ends of both partition walls 118 are in abutment against inner surfaces of both side walls of the duct body 107, and a front portion of the first intake passage 119 opens forward at a front end of the intake duct 105 so as to occupy the whole of a front-end opening of the intake duct 105. Front-end openings 120a of the second intake passages 120 are formed in the front end portions of the intake duct 105 so as to be open in a direction different from the front-end opening direction of the first intake passage 119. In this embodiment, the front-end openings 120a are formed in the front duct body 107 so as to be open upward on both right and left sides of the front end of the first intake passage 119.

The front end portion of the intake duct 105 is formed in a substantially triangular shape so that, when seen from its front side, its upper edge extends along the lower edge of the connection between the head pipe 22 and both main frames 23 and its lower edge extends along an upper portion of the radiator 89. A grille 121 is attached to the front end of the intake duct 105. The grille 121 includes a frame member 122 of a shape corresponding to the front-end opening edge of the intake duct 105 and a net member 123 whose peripheral edge portion is supported by the frame member 122. Integral with the frame member 122 are a pair of baffle plates 122a that are disposed at positions spaced through gaps from the front-end openings 120a of the second intake passages 120. With a pair of screw members 124, the baffle plates 122a are clamped to both sides of a front portion of the front duct body 107. Positioning pins 125 for preventing a lower portion of the frame member 122 from leaving the front end of the intake duct 105 are projected from a front end of the lower lid plate 108 so as to be inserted through the lower portion of the frame member 122.

A butterfly type intake air control valve 126 is disposed within the first intake passage 119 which is on-off controlled in accordance with the number of revolutions of the engine E so as to close the first intake passage 119 during low speed rotation of the engine E and open the first intake passage 119 during high speed rotation of the engine E. Within the second intake passages 120 are disposed butterfly type second intake air control valves 127 which are on-off controlled in accordance with the number of revolutions of the engine E so as to open the second intake passages 120 during low speed rotation of the engine E and close the second intake passages 120 during high speed rotation of the engine E. The first and second intake air control valves 126, 127 are fixed in common to a valve stem 128 which has an axis orthogonal to the air flowing direction of air flowing through the first intake passage 119 and which is supported rotatably by the intake duct 105.

The valve stem 128 is supported pivotably by the partition walls 118 at portions corresponding to the front-end openings 120a of the second intake passages 120 in the intake duct 105. Two sets of screw members 110 out of the plural screw members 110 for clamping the front duct body 107 to the lower lid plate 108 are threaded into the partition walls 118 at positions at which they sandwich the valve stem 128 from both sides.

As shown in FIG. 14, the first intake air control valve 126 for changing the flow area of the first intake passage 119 is fixed to the valve stem 128 so as to assume a rearwardly upwards inclined posture in a closed state of the first intake passage 119. The first intake air control valve 126 is formed so that, in a closed state thereof, the area of an upper portion than the valve stem 128 is larger than the area of a lower portion than the valve stem. Further, as indicated with a chain line in FIG. 14, the first intake air control valve 126, in an open state thereof, becomes substantially horizontal so that the resistance to air flowing through the first intake passage 119 is a minimum.

The second intake air control valves 127 for changing the flow area of the second intake passages 120 are fixed to the valve stem 128 so as to open the front-end openings 120a of the second intake passages 120 when the first intake air control valve 126 closes the first intake passage 119. A pivot shaft 130 parallel to the valve stem 128 is disposed on a rear side with respect to the valve stem 128 and below the intake duct 105. The pivot shaft 130 is supported pivotably by plural bearings 129 which are projected from a lower surface of the intake duct 105, i.e., a lower surface of the lower lid plate 108.

An arm 130a is mounted on the pivot shaft 130 at a portion corresponding to the first intake passage 119, and a connecting rod 131 extends through a lower portion of the intake duct 105, that is, extends through the lower lid plate 108. One end of the connecting rod 131 is connected to a portion of the first intake air control valve 126 in a closed state, and the portion of the first intake air control valve 126 is located higher than the valve stem 128, while an opposite end of the connecting rod 131 is connected to the arm 130a. Therefore, in accordance with a pivotal motion of the pivot shaft 130, the first intake air control valve 126 pivots between a valve closing position indicated with a solid line in FIG. 14 and a valve opening position indicated with a chain line in the same figure.

A pair of return springs 132 adapted to develop a spring force for urging the pivot shaft 130 and the valve stem 128 pivotally in a direction in which the first intake air control valve 126 assumes the valve closing position are disposed between both ends of the pivot shaft 130 and the intake duct 105. The connecting rod 131 extends movably through a through hole 133 formed in the lower lid plate 108. The position at which the connecting rod 131 passes through the lower lid plate 108 shifts forward or rearward accordingly as the arm 130a pivots together with the pivot shaft 130. The through hole 133 is formed long in the longitudinal direction in accordance with such a positional movement.

A driven pulley 134 is fixed to one end of the pivot shaft 130, and a pivoting force is transmitted from an actuator 141 to the driven pulley 134 through a first power transmission wire 135. The actuator 141 is supported by one of the support plates 33 attached to the rear portion of the main frame 23 and is disposed on the left side of an upper portion of the engine body 50.

In FIG. 15, the actuator 141 includes an electric reversible motor and a reduction mechanism for reducing the output of the motor. The actuator 141 is secured to a pair of brackets 33a with bolt 143 through a pair of elastic members 142, the brackets 33a being provided on the aforesaid one support plate 33 in the body frame F. The actuator 141 has an output shaft 144 and a driving pulley 145 is fixed onto the output shaft 144. The driving pulley 145 is formed with a first wire groove 146 of a small diameter and second and third wire grooves 147, 148 of a large diameter.

An end portion of the first power transmission wire 135 which is for transmitting a pivoting force to the driven pulley 134 located on the intake duct 105 side is wound around and engaged in the first wire groove 146. An electronic control unit 149 is connected to the actuator 141. In accordance with the number of revolutions of the engine that is inputted from a sensor (not shown), the electronic control unit 149 controls the operation of the actuator 149.

Referring again to FIGS. 1 and 2, an exhaust system 150, which is contiguous to the engine E, includes individual exhaust pipes 151 which are connected each independently to a lower portion of a front side wall of the cylinder head 86 in the engine body 50, a pair of first confluent exhaust pipes 52 for common connection thereto of the pair of individual exhaust pipes 151, a second confluent exhaust pipe 153 for common connection thereto of the pair of first confluent exhaust pipes 152 and with a first exhaust muffler 154 interposed in an intermediate portion, and a second exhaust muffler 155 connected to a downstream end of the second confluent exhaust pipe 153.

The individual exhaust pipes 151 are extended downward from the front side of the engine body 50, and the first confluent exhaust pipes 152 are disposed below the engine body 50 so as to extend substantially longitudinally. Between the rear wheel WR and the engine body 50, the second confluent exhaust pipe 153 rises while being bent toward the right side of the vehicle body from below the engine body 50 and is extended rearward above the rear wheel WR. The first exhaust muffler 154 is disposed in the rising portion of the second confluent exhaust pipe 153, and a rear end exhaust portion of the exhaust system 150, i.e., a downstream end portion of the second exhaust muffler 155, is disposed higher than the axle 68 of the rear wheel WR.

As seen in FIGS. 16 and 17, the second confluent exhaust pipe 153 which constitutes a part of the exhaust system 150 has a larger-diameter portion 153a at a position in front of and higher than the axle 68 of the rear wheel WR. Within the larger-diameter portion 153a there is disposed an exhaust gas control valve 156 that controls the exhaust pulsation in the exhaust system 150 by changing the flow area in the second confluent exhaust pipe 153 in accordance with the number of revolutions of the engine E.

In low and medium speed regions of the engine E, the exhaust gas control valve 156 is operated to its closing side for utilizing the exhaust pulsation effect in the exhaust system 150 to improve the output of the engine E, while in a high speed region of the engine E, the exhaust gas control valve 156 is operated to its opening side for decreasing the exhaust flow resistance in the exhaust system 150 to improve the output of the engine E. The exhaust gas control valve 156 is fixed to a valve stem 157 that is supported pivotably by the larger-diameter portion 153a of the second confluent exhaust pipe 153.

One end of the valve stem 157 is supported through a sealing member 159 by a bottomed, cylindrical bearing housing 158 which is fixed to the larger-diameter portion 153a, and a driven pulley 161 is fixed to an opposite end of the valve stem 157, the opposite end projecting from the larger-diameter portion 153a through a sealing member 160 which is interposed between the valve stem 157 and the larger-diameter portion 153a. A return spring 162 for urging the valve stem 157 toward the opening side of the exhaust gas control valve 156 is disposed between the valve stem 157 and the larger-diameter portion 153a.

The projecting portion of the valve stem 157 projecting from the larger-diameter portion 153a, as well as the driven pulley 161 and the return spring 162, are received within a case 165, the case 165 including a wooden bowl-like case body 163 fixed to the larger-diameter portion 153a and a lid plate 164 which is clamped to the case body 163 so as to close an open end of the case body 163. Within the case 165, a restriction arm 166 whose front end projects beyond the outer periphery of the driven pulley 161 is fixed to the valve stem 157. A closing-side stopper 167 and an open-side stopper 168 are formed on an inner surface of the case body 163 of the case 165. The closing-side stopper 167 allows a front end of the restriction arm 166 to come into abutment thereagainst to restrict a pivotal motion of the valve stem 157, i.e., the exhaust gas control valve 156, toward the closing side, while the open-side stopper 168 allows the front end of the restriction arm 166 to come into abutment thereagainst to restrict a pivotal motion of the valve stem 157, i.e., the exhaust gas control valve 156 toward the opening side.

An end portion of a second power transmission wire 171 is wound around and engaged in the driven pulley 161. The second power transmission wire 171 causes the exhaust gas control valve 156 to operate to the closing side when it is pulled. An end portion of a third power transmission wire 172 is also wound around and engaged in the driven pulley 161. The third transmission wire 172 when pulled causes the exhaust gas control valve 156 to operate to the opening side. As shown in FIG. 15, an opposite end portion of the second power transmission wire 171 is wound around and engaged in the second wire groove 147 of the driving pulley 144 in the actuator 141 in a direction opposite to the winding direction of the first power transmission wire 135, and an opposite end portion of the third power transmission wire 172 is wound around and engaged in the third wire groove 148 of the driving pulley 144 in the same direction as the winding direction of the first power transmission wire 135.

The actuator 141 for actuating the exhaust gas control valve 156 which is controlled in accordance with the number of revolutions of the engine E is connected to the first intake air control valve 126 to actuate the same valve in the intake duct 105. It is preferable that the larger-diameter portion 153a of the second confluent exhaust pipe 153 in which portion there is disposed the exhaust air control valve 156 be disposed below the main seat 90 for avoiding insofar as possible the exertion of an undesirable external force on the second and third power transmission wires 171, 172 from above. The case 165 is disposed in a state exposed to the exterior in when viewed from a side view for making it easier for the vehicle to operate while wind during operation strikes against the case 165.

The actuator 141 is disposed behind and above the engine body 50 at a position at which the distance from the valve stem 128 in the intake duct 105 and the distance from the valve stem 157 of the exhaust gas control valve 156 are almost equal to each other in a preferred embodiment. It is possible to diminish obstacles present between the driven pulley 161 for the exhaust gas control valve 156 and the actuator 141 and it is possible to facilitate the layout of both second and third power transmission wires 171, 172 which connect the driven pulley 161 and the actuator 141 with each other.

In FIGS. 18 and 19, the first confluent exhaust pipes 152 which constitute a part of the exhaust system 150 have larger-diameter portions 152a at portions positioned below the engine body 50, and a catalyst member 175 is received within the larger-diameter portion 152a. With the catalyst member 175 thus disposed below the engine body 50, the exhaust gas discharged from the cylinder head 86 can flow through the catalyst member 175 while retaining a relatively high temperature.

In the catalyst member 175, a cylindrical catalyst carrier 177 which permits the flow of exhaust gas therethrough is accommodated within a cylindrical case 176 in such a manner that one end thereof is positioned inside one end of the case 176. The case 176 is formed of a material different from the material of the first confluent exhaust pipes 152. For example, the first confluent exhaust pipes 152 are formed of titanium, while the case 176 and catalyst carrier 177 in the catalyst member 175 are formed of stainless steel.

A bracket 178 formed of the same material, e.g., titanium, as that of the first confluent exhaust pipes 152 is welded to an inner periphery surface of the larger-diameter portion 152a in each first confluent exhaust pipe 152. The bracket 178 is integrally provided with a large ring portion 178a which surrounds one end portion of the case 176 and which is fitted into the larger-diameter portion 152a. A small ring portion 178b which is contiguous to the large ring portion 178a so as to permit one end of the case 176 to be fitted therein, and extending arm portions 178c extending to the side opposite to the large ring portion 178a from a plurality of positions, e.g., four, of the small ring 178b are equally spaced with respect to the circumferential direction.

Through holes 179 are formed in plural circumferential positions of the larger-diameter portion 152a in such a manner that an outer periphery surface of the large ring portion 178a faces therein, and in the through holes 179, the large ring portion 178a is welded to the larger-diameter portion 152a, whereby the bracket 178 is welded to the larger-diameter portion 152a of the first confluent exhaust pipe 152. The extending arm portions 178c are caulked to one end of the case 176 for the catalyst carrier 175. The bracket 178 welded to the larger-diameter portion 152a of the first confluent exhaust pipe 152 is caulked to one end of the case 176 at a portion projecting from one end of the catalyst carrier 177.

A ring 180 formed by stainless mesh is fixed by spot welding to an outer surface of an opposite end of the case 176 in the catalyst member 175. The ring 180 is positioned between the larger-diameter portion 152a of the first confluent exhaust pipe 152 and the opposite end portion of the case 176, whereby an opposite end side of the catalyst member 17, whose one end side is fixed to the larger-diameter portion 152a through the bracket 178, can slide on responsive to thermal expansion. Accordingly, a stress induced by thermal expansion of the catalyst member 175 can be prevented from acting between one end portion of the catalyst member 175 and the larger-diameter portion 152a.

Referring again to FIG. 1, a front portion of the head pipe 22 is covered with a front cowl 181 made of a plastic resin, and both sides of a front portion of the vehicle body are covered with a center cowl 182 of a synthetic resin contiguous to the front cowl 181. Further, a lower cowl 183 of a synthetic resin that covers the engine body 50 from both sides is contiguous to the center cowl 182. Rear portions of the seat rails 30 are covered with a rear cowl 184. A front fender 185 which covers the front wheel WF from above is attached to the front fork 21, and a rear fender 186 which covers the rear wheel WR from above is attached to the seat rails 30.

Operation of this embodiment will be described in greater detail hereinafter. The first cross pipe 27 is mounted extending spanwise between the front portions of the pair of right and left main frames 23 which are contiguous to the head pipe 22 at the front end of the body frame F. Mounting holes 32 are coaxially formed in the front inner walls of both main pipes 23 and both ends of the first cross pipe 27 inserted into the mounting holes 32 are welded to the inner walls of the main frames 23. Therefore, by changing the amount of insertion of both ends of the first cross pipe 27 into the mounting holes 32, it is possible to absorb a dimensional error between the pair of right and left main frames 23 and an error in axial length of the first cross pipe 27, and both ends of the first cross pipe 27 can be welded positively to the inner walls of the main frames 23.

The head pipe 22 is integrally provided with the cylindrical portion 22a which supports the front fork 21 and the pair of right and left gussets 22b which extends rearward and downward from the cylindrical portion 22a. The main frames 23 are at least provided with the gussets 22b and pipe members 31 which are welded to the gussets 22b respectively. Integral with the gussets 22b are extending portions 22c, the extending portions 22c being extended so as to be positioned inside the inner walls of the pipe members 31 and so as to constitute the front inner walls of the main frames 23. In the extending portions 22c are formed mounting holes 32 for insertion therein of both end portions of the first cross pipe 27 opposed to the front inner walls of the pipe members 31. Both ends of the first cross pipe 27 are welded to the outer surfaces of the extending portions 22c. Since both end portions of the first cross pipe 27 are welded to the outer surfaces of the extending portions 22c integral with the gussets 22b which constitute a part of the main frames 23, the welding of the first cross pipe 27 to the main frames 23 can be done easily and the welded portions are not visible from the exterior, thus improving the appearance.

Each pipe member 31 is formed in a vertically long, prismatic shape having the inner wall 31a which is substantially flat throughout the overall length in the vertical direction and the outer wall 31b which substantially extends along the inner wall 31a, and the pipe member 31 is subjected to bending in a plane PL orthogonal to the inner wall 31a, so that the bending of the pipe member 31 can be done easily.

Moreover, both pipe members 31 are inclined toward each other as they extend upward, and are connected contiguously to the gussets 22b of the head pipe 22. With such a simple structure involving the inclined form of the pipe members 31, not only it is possible to widen the distance between the lower portions of both pipe members 31 and ensure a sufficient mounting space for the engine E, but also it is possible to narrow the distance between the upper portions of both pipe members 31 and thereby make it difficult for rider's knees to abut the pipe members 31.

In connection with supporting the engine body 50 by both upper and lower portions of the pivot plates 26 in the body frame F, an insertion hole 53 for insertion therein of a mounting bolt 52 and a first retaining portion 54 which surrounds the outer end of the insertion hole 53 for engagement with the larger-diameter portion 52a formed at one end of the mounting bolt 52, are formed in one pivot plate 26, while in the other pivot plate 26 there are formed a tapped hole 57 coaxial with the insertion hole 53 and a second retaining portion 58 which surrounds the outer end of the tapped hole 57. Further, a cylindrical bolt 60 is threaded into the tapped hole 57 so that the engine body 50 is held between one end of the cylindrical bolt 60 and the inner surface of the one pivot plate 26 and so that the opposite end of the cylindrical bolt 60 is positioned inside the second retaining portion 58. The mounting bolt 52 is inserted through the insertion hole 53, the engine body 50, the cylindrical bolt 60 and the tapped hole 57 and projects from the tapped hole 57, and a nut 63 capable of coming into engagement with the second retaining portion 58 is threaded onto the opposite end of the mounting bolt 52 to secure the arrangement.

According to such a support structure for supporting the engine body 50 for the body frame F, by adjusting the position of engagement of the cylindrical bolt 60 with the tapped hole 57, the engine body 50 can be held positively between one pivot plate 26 and one end of the cylindrical bolt 60 while absorbing a dimensional error between both pivot plates 26 and an error in transverse size of the engine body 50. Besides, the larger-diameter head portion 52a at one end of the mounting bolt 52 is engaged with the first retaining portion 54 of one pivot plate 26 and the nut 63 is engaged with the second retaining portion 58 of the other pivot plate 26, so that both ends of the mounting bolt 52 can be clamped to the body frame F while their axial positions are established firmly, and thus it is possible to enhance the mounting stiffness of the engine body 50.

Since the cylindrical stop bolt 61, which is in abutment against the opposite end of the cylindrical bolt 60, is threaded into the tapped hole 57 so as to be positioned inside the second retaining portion 58, it is possible to let the stop bolt 61 be in contact with the opposite end face of the cylindrical bolt 60 and thereby effectively prevent loosening of the bolt 60. Intake air passages 92 are connected to the upper side wall of the cylinder head 86 provided in the engine body 50, the intake air passages 92 extending linearly so as to introduce purified air from the air cleaner 87 which is disposed above the cylinder head 86, the first injectors 100 for injecting fuel from above into the intake air passages 92 are mounted to the cleaner case 96 of the air cleaner 87, and the fuel tank 88 is disposed so as to cover the rear and upper portions of the air cleaner 87. The first injectors 100 are disposed ahead of centerlines C1 of the intake air passages 92.

That is, the first injectors 100 are disposed at forwardly offset positions from the centerlines C1 of the intake air passages 92. On the centerlines C1 of the intake air passages 92, the bottom wall of the fuel tank 88 can be set at a relatively low position while avoiding interference with the first injectors 100, and therefore it is possible to ensure a sufficient capacity of the fuel tank 88.

The first injectors 100 are disposed ahead of the centerline C2 of the oil supply port 101 formed in a front portion of the fuel tank 88, and on the centerline C2 of the oil supply port 101, the first injectors 100 do not interfere with the fuel tank 88, so it is possible to set the oil supply port 101 at a lower position. In addition, on a projection diagram onto a plane parallel to the centerline C2 of the oil supply port 101 and the centerline C1 of each intake air passage 92, the first injectors 100 are each mounted to the cleaner case 96 of the air cleaner 87 so that the upper portion thereof is located ahead of the intersecting point P of both centerlines C1 and C2. Consequently, the bottom wall of the fuel tank 88 can be set at a lower position ahead of the centerline C2 of the oil supply port 101. Thus, it is possible to ensure a sufficient capacity of the fuel tank 88 and that of the air cleaner 87. The insertion of an oil supply nozzle can be done more easily at the time of oil supply.

Further, the second injectors 103 for injecting fuel into the intake air passages 92 are mounted at a rear side portion of the throttle body 94 in the intake air passages 92. Therefore, the first injectors 100 which inject fuel from above the intake air passages 92 so that a relatively low temperature fuel is fed to make contribution to the improvement in output of the engine E, and the second injectors 103 which can inject fuel in quick response to the operation of the engine E, can be disposed by utilizing the space for the intake air passages 92 effectively in a well-balanced manner.

The air cleaner 87 is disposed behind the head pipe 22 mounted at the front end of the body frame F and the intake duct 105 extending forward from the air cleaner 87 is disposed below the head pipe 22. The first intake passage 119 whose transversely central position lies on the transverse centerline C3 of the front wheel WF and the pair of right and left second intake passages 120 disposed on both sides of the first intake passage 119 are formed within the intake duct 105 in a state in which the flow area of the first intake passage 119 is larger than the total flow area of both second intake passages 120. The first intake air control valve 126 adapted to close the first intake passage 119 during low speed rotation of the engine E and open the first intake passage 119 during high speed rotation of the engine E is disposed in the first intake passage 119.

According to such a construction of the duct 105, when the engine E is operating at a low speed, e.g., when the motorcycle is running at a low speed because of a road surface which is apt to kick up water and foreign matter, the first intake passage 119 whose transversely central portion lies on the transversely centerline C3 of the front wheel WF is closed, so that the entry of water and foreign matter into the air cleaner 87 can be prevented and/or eliminated. During high speed rotation of the engine E, water and foreign matter are more difficult to be kicked up by the wind from the front side of the moving vehicle, so that the entry of water and foreign matter into the air cleaner 87 can be more easily prevented. Further, since the first intake passage 119 having a large flow area opens, a relatively large amount of air is introduced into the air cleaner 87, whereby it is possible to make contribution to realizing a high engine output.

Moreover, the first intake air control valve 126 is fixed to the valve stem 128 which is supported pivotably by the intake duct 105, and the pair of second intake air control valves 127 which cause the flow area of the second intake passages 120 to change are fixed so as to open the second intake passages 120 during low speed rotation of the engine E and close the second intake passages 120 during high speed rotation of the engine E.

Thus, the amount of intake air can be kept small during low speed operation of the engine E by on-off controlling the first intake air control valve 126 and the second intake air control valves 127, whereby, even when there is performed an operation for acceleration, an appropriate rich mixture can be fed to the engine E while preventing the mixture from becoming thin and hence it is possible to attain a satisfactory accelerating performance. During high speed operation of the engine E, it is possible to decrease the intake resistance and thereby enhance the volumetric efficiency of the engine E and contribute to the improvement of high-speed output performance. Moreover, since the first intake air control valve 126 and the pair of second intake air control valves 127 can be opened and closed by pivoting the valve stem 128, there can be attained a simple structure.

Baffle plates 122a are disposed at positions spaced apart from the front-end openings 120a of the second intake passages 120 through gaps formed between the baffle plates 122a and the front-end openings 120a, and are secured to the intake duct 105. When the outside air is introduced from the second intake passages 120 into the air cleaner 87, the entry of water and foreign matter into the second intake passages 120 can be prevented as far as possible by a labyrinth structure constituted by the baffle plates 122a.

The front end of the first intake passage 119 is opened forward at the front end of the intake duct 105 and the front-end openings 120a of the second intake passages 120 are formed in the front end of the intake duct 105 so as to open in a direction different from front-end opening direction of the first intake passage 119, so when the engine E is rotating at a high speed, it is possible to introduce the vehicle running wind efficiently into the first intake passage 119 and improve the intake efficiency and it is also possible to make water and foreign matter difficult to enter the second intake passages 120 which introduce air during low speed rotation of the engine E.

The front end portion of the intake duct 105 is formed in a substantially triangular shape in such a manner that, when seen from the front side, the upper edge of the front end portion extends along the lower edges of the connections between the head pipe 22 and the main frames 23, while the lower edge of the front end portion extends along the upper portion of the radiator 89 which is disposed below the intake duct 105. The intake duct 105 can be effectively disposed within the space between the head pipe 22, both main frames 23 connections and the radiator 89 while ensuring a large opening in its front end portion.

Further, the actuator 141 is mounted on the motorcycle for actuating the exhaust gas control valve 156 that is controlled in accordance with the number of revolutions of the engine E. Since the actuator 141 is connected to the first and second intake air control valves 126, 127 for opening and closing those valves, it is possible to prevent an increase in the number of parts and actuate the first and second intake air control valves 126, 127 while attaining the reduction in size and weight of the intake system.

The valve stem 128 has an axis orthogonal to the air flowing direction in the first intake passage 119 and is supported pivotably by the intake duct 105, and the first intake air control valve 126 is fixed to the valve stem 128 so as to be inclined rearwardly and upwardly in a closed state of the first intake passage 119. This construction is advantageous in preventing the entry of water and foreign matter into the air cleaner 87. That is, water and foreign matter splashed up by the front wheel WF are apt to enter an upper portion in the interior of the front-end opening of the first intake passage 119, but when the first intake air control valve 126 starts operating from its closed state to its open state, splashed-up water and foreign matter become easier to strike on the first intake air control valve 126 even upon entry thereof into the front-end opening of the first intake passage 119. Thus, it is possible to prevent water and foreign matter from passing the first intake air control valve 126 and entering the air cleaner 87 side.

The first intake air control valve 126 is formed so that, in its closed state, the area of its portion higher than the valve stem 128 is larger than the area of its portion lower than the valve stem 128. This is more advantageous in preventing the entry of foreign matter into the first intake passage 119. The axles 68 of the rear wheel WR are supported and capable of being rotated by the rear end of the swing arm 66 whose front end is supported by and capable of swinging with respect to the body frame F. The engine body 50 is mounted on the body frame F on the front side with respect to the rear wheel WR, and the exhaust system 150 is connected to the cylinder head 86 in the engine body 50. The rear-end exhaust portion of the exhaust system 150 is located at a higher position than the axle 68. In the second confluent exhaust pipe 153 that constitutes a part of the exhaust system 150 there is disposed the exhaust gas control valve 156 for adjusting the flow area in the second confluent exhaust pipe 153. The exhaust gas control valve 156 is located at a front and higher position with respect to the axle 68 of the rear wheel WR.

According to such a way of arrangement of the exhaust air control valve 156, the control valve 156 can be disposed at a position that is difficult to be influenced by the rear wheel WR and which is spaced away from the grounding surface of the rear wheel. Thus, the exhaust gas control valve 156 can be disposed in a good environment where a bad influence is scarcely exerted on the operation of the exhaust gas control valve 156 from the rear wheel WR and from the grounding surface of the rear wheel WR.

The catalyst member 175 having a cylindrical case 176 formed of a material different from the material of the first confluent exhaust pipe 152 which constitutes a part of the exhaust system 150 is received within the first confluent exhaust pipe 152. In fixing the catalyst member 175, the bracket 178 formed of the same material as the material of the first confluent exhaust pipe 152 is welded to the inner periphery surface of the larger-diameter portion 152a of the first confluent exhaust pipe 152 and is caulked to the case 176 of the catalyst member 175.

Thus, even in the case where the case 176 of the catalyst member 175 and the first confluent exhaust pipe 152 are made of different materials, the catalyst member 175 can be accommodated and fixed within the first confluent exhaust pipe 152 and hence it is possible to increase the degree of freedom of material selection for the case 176 of the catalyst member 175 and the first confluent exhaust pipe 152.

Besides, the catalyst carrier 177 in the catalyst member 175 is formed columnarly within the cylindrical case 176 so as to permit the passage of exhaust gas and so that one end thereof is positioned inside one end of the case 176. The bracket 178, at a projecting portion thereof with respect to one end of the catalyst carrier 177, is caulked to one end of the case 176. Consequently, the catalyst member 175 can be fixed to the first confluent exhaust pipe 152 by a simple structure without exerting any influence on the catalyst carrier 177.

Further, the catalyst member 175 not having any movable part is disposed below the engine E in the exhaust system 150, while the exhaust gas control valve 156 having a movable part is disposed behind and above the engine E in the exhaust system 150, so that the catalyst member 175 and the exhaust gas control valve 156 can be spaced apart from each other in the exhaust system 150 and hence it is possible to prevent the exhaust gas control valve 156 from being adversely affected by the heat generated from the catalyst member 175.

According to the present invention, as set forth above, it is easy to bend pipe members, and by such a simple structure as pipe members being merely inclined, not only it is possible to widen the distance between lower portions of both pipe members and thereby ensure a sufficient mounting space for the engine, but also it is possible to narrow the distance between upper portions of both pipe members and thereby make it difficult for rider's knees to strike on the pipe members.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle frame comprising:
   a head pipe;
   a front fork for supporting a front wheel through a shaft, wherein said front fork is rotatable with respect to and supported by said head pipe; and
   a pair of right and left pipe members connected contiguously at front end portions thereof to said head pipe, the pipe members being curved in an outwardly convex shape with respect to a longitudinal centerline of said motorcycle frame at a longitudinally intermediate position of each pipe member when viewed from a top view, wherein a distance between lower portions at the longitudinally intermediate position of each pipe member is greater than a distance between upper portions at the longitudinally intermediate position of each pipe member, each of the pipe members including an inner wall and an outer wall;

the inner wall being formed with a substantially continuous inwardly and downwardly facing concave surface throughout an overall length of each pipe member and with respect to a vertical direction of each pipe member, and the outer wall being formed with a substantially continuous outwardly and upwardly facing convex surface and being substantially parallel with the inner wall, and wherein the inner wall and the outer wall of each of the pipe members join each other at an upper-most edge, the upper-most edge of each of the pipe members being curved in an upward direction when viewed from a side view, and having an outwardly facing convex shape when viewed from a top view.

2. The motorcycle frame according to claim 1, further comprising an engine mounting space being disposed between lower portions of said right and left pipe members.

3. The motorcycle frame according to claim 1, further comprising a pair of engine hangers secured to the front end portions of the right and left pipe members.

4. The motorcycle frame according to claim 3, wherein the respective engine hanger is welded to a lower portion of the respective pipe member.

5. The motorcycle frame according to claim 1, further comprising:
   a pair of right and left pivot plates extending downward from rear end portions of the right and left pipe members; and
   a first cross pipe extending across a span between the front end portions of the right and left pipe members.

6. The motorcycle frame according to claim 5, further comprising:
   a second cross pipe extending across a span between upper portions of the pivot plates; and
   a third cross pipe extending across a span between lower portions of the pivot plates.

7. The motorcycle frame according to claim 5, further comprising a pair of seat rails extending rearwardly and upwardly with respect to and being connected with the rear end portions of both right and left pipe members.

8. The motorcycle frame according to claim 7, wherein the head pipe includes a cylindrical portion for rotatably supporting the front fork, and a pair of right and left gussets extending rearward and downward from the cylindrical portion of the head pipe.

9. The motorcycle frame according to claim 8, further comprising a right and a left main frame, wherein each of said right and left main frames include a respective gusset, one of said pipe members welded at the front end portion thereof to the gussets, and pipe portions integral with the pivot plates and welded to rear ends of the pipe members.

10. The motorcycle frame according to claim 9, wherein each of said pipe members includes a respective rib that partitions an interior of the pipe member.

11. The motorcycle frame according to claim 1, wherein the head pipe includes a cylindrical portion for rotatably supporting the front fork, and a pair of right and left gussets extending rearward and downward from the cylindrical portion of the head pipe.

12. The motorcycle frame according to claim 1, further comprising:
   a pair of right and left pivot plates extending downward from rear end portions of the right and left pipe members; and
   a first cross pipe extending across a span between the front end portions of the right and left pipe members.

13. The motorcycle frame according to claim 12, further comprising:
   a second cross pipe extending across a span between upper portions of the pivot plates; and
   a third cross pipe extending across a span between lower portions of the pivot plates.

14. The motorcycle frame according to claim 1, wherein each of said pipe members includes a respective rib that vertically partitions an interior of the pipe member, said rib being provided between vertically intermediate inner wall portions of each pipe member.

15. A motorcycle comprising:
   an engine;
   a front wheel and a rear wheel;
   a head pipe;
   a front fork for supporting the front wheel through a shaft, wherein said front fork is rotatable with respect to and supported by said head pipe; and
   a pair of right and left pipe members connected contiguously at front end portions thereof to said head pipe,
   the pipe members being curved in an outwardly convex shape with respect to a longitudinal centerline of said motorcycle at a longitudinally intermediate position of each pipe member when viewed from a top view,
   wherein a distance between lower portions at the longitudinally intermediate position of each pipe member is greater than a distance between upper portions at the longitudinally intermediate position of each pipe member,
   each of the pipe members including an inner wall and an outer wall;
   the inner wall being formed with a substantially continuous inwardly and downwardly facing concave surface throughout an overall length of each pipe member and with respect to a vertical direction of each pipe member, and the outer wall being formed with a substantially continuous outwardly and upwardly facing convex surface and being substantially parallel with the inner wall,
   wherein the inner wall and the outer wall of each of the pipe members join each other at an upper-most edge, the upper-most edge of each of the pipe members being curved in an upward direction when viewed from a side view, and having an outwardly facing convex shape when viewed from a top view, and
   wherein the engine is disposed between lower portions of said right and left pipe members.

16. The motorcycle according to claim 15, further comprising:
   a pair of engine hangers secured to the front end portions of both right and left pipe members.

17. The motorcycle according to claim 16, further comprising:
   a pair of right and left pivot plates extending downward from rear end portions of the right and left pipe members; and a first cross pipe extending across a span between the front end portions of the right and left pipe members.

18. The motorcycle according to claim 17, further comprising:
a second cross pipe extending across a span between upper portions of the pivot plates; and
a third cross pipe extending across a span between lower portions of the pivot plates.

19. The motorcycle according to claim 18, further comprising:
a pair of seat rails extending rearwardly and upwardly with respect to and being connected with the rear end portions of the right and left pipe members; and
wherein the head pipe includes a cylindrical portion for rotatably supporting the front fork, and a pair of right and left gussets extending rearward and downward from the cylindrical portion of the head pipe.

20. A motorcycle frame comprising:
a head pipe;
a front fork for supporting a front wheel through a shaft, wherein said front fork is rotatable with respect to and supported by said head pipe;
a pair of right and left pipe members each having a substantially prismatic shape,
wherein each of said right and left pipe members is bent in an outwardly convex shape with respect to a longitudinal centerline of said motorcycle frame at a longitudinally intermediate position of each pipe member, the pipe members extending upwardly toward and being connected contiguously to the head pipe; and
a pair of right and left pivot plates extending downward from rear end portions of the right and left pipe members;
a first cross pipe extending across a span between front end portions of the right and left pipe members;
a second cross pipe extending across a span between upper portions of the pivot plates; and
a third cross pipe extending across a span between lower portions of the pivot plates,
each of the pipe members further including an inner wall which is formed as a substantially continuous concave curve throughout an overall length of the pipe members and with respect to a vertical direction of the pipe member, and
an outer wall which extends substantially parallel with the inner wall, wherein upper portions of the inner walls of the pipe members are closer to each other than are lower portions of the inner walls of the pipe members,
wherein the inner wall and the outer wall of each of the pipe members join each other at an upper-most edge, the upper-most edge of each of the pipe members being curved in an upward direction when viewed from a side view, and having an outwardly facing convex shape when viewed from a top view.

* * * * *